(12) United States Patent
Orr

(10) Patent No.: US 12,417,499 B2
(45) Date of Patent: Sep. 16, 2025

(54) METHODS AND SYSTEMS OF FACILITATING TRADING NON-NEGOTIABLE FINANCIAL ASSETS

(71) Applicant: CDXCHANGE, INC., Live Oak, FL (US)

(72) Inventor: Shawn William Orr, Weston, VT (US)

( * ) Notice: Subject to any disclaimer, the term of this patent is extended or adjusted under 35 U.S.C. 154(b) by 58 days.

(21) Appl. No.: 18/291,544

(22) PCT Filed: Jul. 25, 2022

(86) PCT No.: PCT/US2022/038232
§ 371 (c)(1),
(2) Date: Jan. 23, 2024

(87) PCT Pub. No.: WO2023/004199
PCT Pub. Date: Jan. 26, 2023

(65) Prior Publication Data
US 2024/0265445 A1    Aug. 8, 2024

Related U.S. Application Data

(60) Provisional application No. 63/225,191, filed on Jul. 23, 2021.

(51) Int. Cl.
*G06Q 40/04* (2012.01)
(52) U.S. Cl.
CPC .................... *G06Q 40/04* (2013.01)
(58) Field of Classification Search
CPC ..... G06Q 40/04; G06Q 2220/00; G06Q 40/06
See application file for complete search history.

(56) References Cited

U.S. PATENT DOCUMENTS

| 11,055,779 B1 * | 7/2021 | Faust, Jr. ............... G06Q 40/04 |
| 2004/0039674 A1 * | 2/2004 | Coloma ................ G06Q 40/06 |
| | | 705/36 R |
| 2007/0162365 A1 | 7/2007 | Weinreb |

(Continued)

FOREIGN PATENT DOCUMENTS

| WO | WO-2004025399 A2 * | 3/2004 | ............ G06Q 10/02 |
| WO | WO-2020058993 A1 * | 3/2020 | |

OTHER PUBLICATIONS

Fries et al. : Implementing a financial derivative as a smart contract, Feb. 25, 2019, pp. 1-51 (Year: 2019).*

(Continued)

*Primary Examiner* — Bijendra K Shrestha
(74) *Attorney, Agent, or Firm* — Ziegler IP Law Group, LLC

(57) ABSTRACT

The present disclosure provides a method of facilitating trading non-negotiable financial assets. Further, the method may include receiving an issue data from at least one issuer device associated with at least one issuer, issuing a certificate of deposit (CD) based on the issue data, receiving a purchase request data from at least one investor device associated with at least one investor, identifying the CD based on the CD identifier, processing a transaction for the CD using one or more investor data, generating one or more transaction attributes associated with the transaction based on the processing, storing the one or more transaction attributes in a distributed ledger using a smart contract, and transmitting the CD to the at least one investor device.

14 Claims, 25 Drawing Sheets

(56) References Cited

U.S. PATENT DOCUMENTS

2011/0196777 A1  8/2011  Friedman et al.
2012/0047090 A1* 2/2012  Gunther ................. G06Q 40/06
                                                    705/36 R
2019/0340685 A1* 11/2019 Wade ................. G06Q 20/4014

OTHER PUBLICATIONS

Gallersdorfer et al.: teSC: TLS/SSL—Certificate Endorsed Smart Contracts, 2021, Technical University of Munich, Munich, Germany, pp. 95-100 (Year: 2021).*
The Architect: Certificate of Deposits—How the crypto world adopted it, Apr. 22, 2022, Medium, pp. 1-8 (Year: 2022).*

* cited by examiner

METHODS AND SYSTEMS OF FACILITATING TRADING NON-NEGOTIABLE FINANCIAL ASSETS

FIELD OF THE INVENTION

Generally, the present disclosure relates to the field of data processing. More specifically, the present disclosure relates to methods and systems of facilitating trading non-negotiable financial assets.

BACKGROUND OF THE INVENTION

The field of data processing is technologically important to several industries, business organizations, and/or individuals.

The US banking system reported more than $1.75 trillion in deposits in a non-negotiable certificate of deposits (CDs) and another 5 trillion in Money Market Accounts (MMAs) as of December 2020. Further, these deposits are static by past and current design, utilized by banks for investments, loans, and reserve accounts. Further, these assets have no independent mechanism that can audit the actual owner of the deposit at any moment except for the bank that holds the deposit.

Blockchain is a revolutionary technology affecting all financial transactions by creating new types of digital platforms, by allowing a network of economic agents (individuals, firms, devices, etc.) to agree, at regular intervals, about the true state of some jointly curated, shared, and maintained data. This shared data can represent ownership or balances in all types of financial assets and liabilities.

Existing techniques for facilitating trading of non-negotiable assets are deficient with regard to several aspects. For instance, current technologies impose transfer restrictions on the certificate of deposits (the non-negotiable assets), reducing its usability in a dynamic investment portfolio. Furthermore, current technologies do not take advantage of interest rate fluctuations with regard to asset appreciation. Furthermore, current technologies do not allow the termination of the certificate of deposits before maturity. Furthermore, current technologies charge expensive fees from the issuer for issuing the certificate of deposits. Moreover, current technologies do not have an efficient marketplace for the brokers or dealers to trade the certificate of deposits.

Therefore, there is a need for improved systems and methods for facilitating trading of non-negotiable financial assets that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides a method of facilitating trading non-negotiable financial assets. Further, the method may include receiving, using a communication device, an issue data from one or more issuer devices associated with one or more issuers. Further, the method may include issuing, using a processing device, a certificate of deposit (CD) based on the issue data. Further, the non-negotiable financial asset may include the certificate of deposit. Further, the certificate of deposit may be a savings account holding a fixed amount of money for a specified time. Further, the method may include receiving, using the communication device, a purchase request data from one or more investor devices associated with one or more investors. Further, the purchase request data may include a CD identifier associated with the CD and one or more investor data associated with the one or more investors. Further, the one or more investors may be interested in buying the CD. Further, the method may include identifying, using the processing device, the CD based on the CD identifier. Further, the method may include processing, using the processing device, a transaction for the CD using the one or more investor data. Further, the method may include generating, using the processing device, one or more transaction attributes associated with the transaction based on the processing. Further, the method may include storing, using a storage device, the one or more transaction attributes in a distributed ledger using a smart contract. Further, the one or more transaction attributes may be validated through a proof-of-stake with one or more CDCoins. Further, the method may include transmitting, using the communication device, the CD to the one or more investor devices.

The present disclosure provides a system of facilitating trading non-negotiable financial assets. Further, the system may include a communication device. Further, the communication device may be configured for receiving an issue data from one or more issuer devices associated with one or more issuers. Further, the communication device may be configured for receiving a purchase request data from one or more investor devices associated with one or more investors. Further, the purchase request data may include a CD identifier associated with a certificate of deposit and one or more investor data associated with the one or more investors. Further, the one or more investors may be interested in buying the CD. Further, the communication device may be configured for transmitting the CD to the one or more investor devices. Further, the system may include a processing device communicatively coupled with the communication device. Further, the processing device may be configured for issuing the CD based on the issue data. Further, the non-negotiable financial asset may include the certificate of deposit. Further, the certificate of deposit may be a savings account holding a fixed amount of money for a specified time. Further, the processing device may be configured for identifying the CD based on the CD identifier. Further, the processing device may be configured for processing a transaction for the CD using the one or more investor data. Further, the processing device may be configured for generating one or more transaction attributes associated with the transaction based on the processing. Further, the system may include a storage device communicatively coupled with the communication device. Further, the storage device may be configured for storing the one or more transaction attributes in a distributed ledger using a smart contract. Further, the one or more transaction attributes may be validated through a proof-of-stake with one or more CDCoins.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
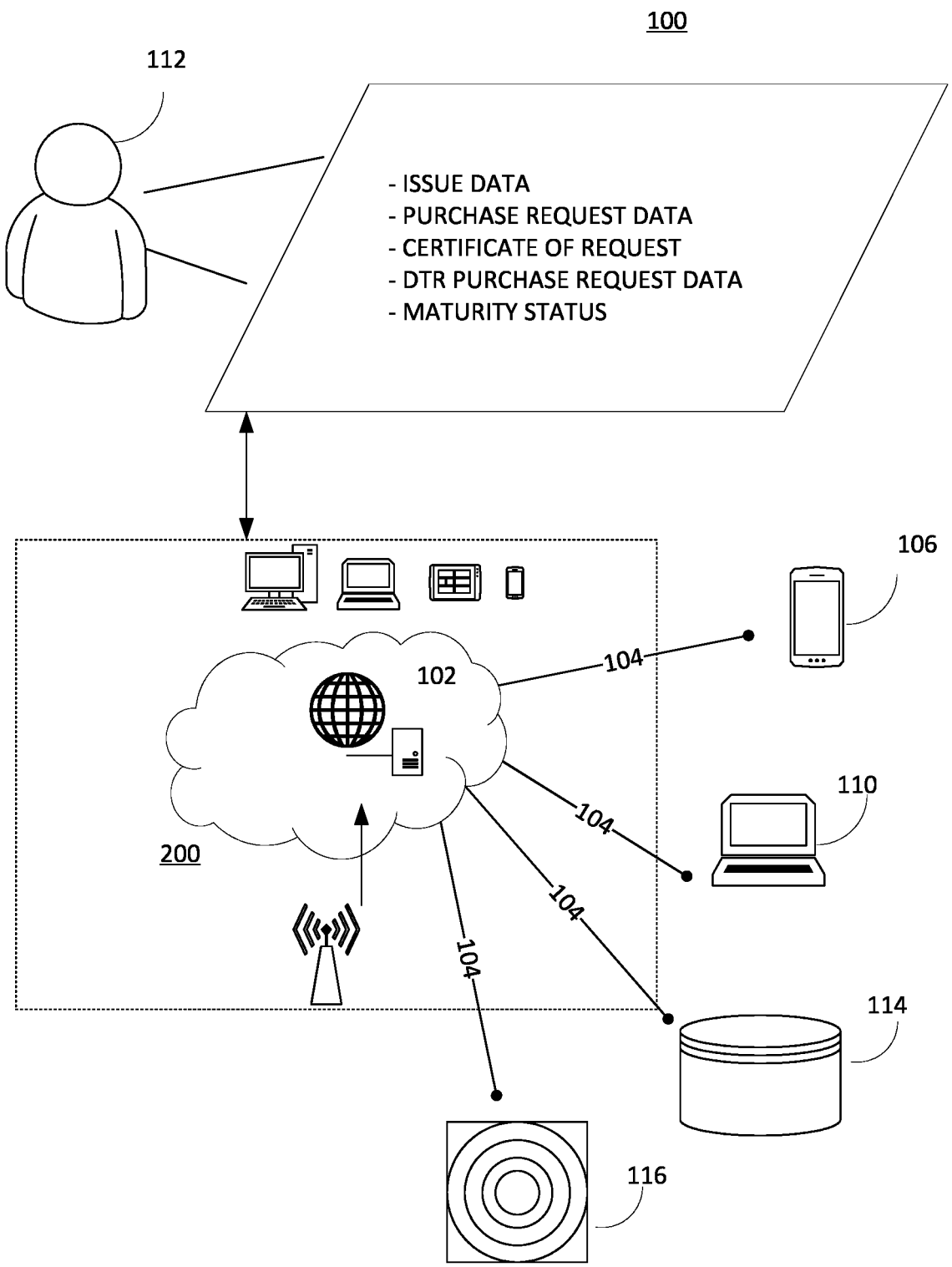
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems of facilitating trading non-negotiable financial assets, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, physical state and/or physiological state and/or psychological state of the user, and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), and a biometric sensor (e.g. a fingerprint sensor) associated with the device corresponding to performance of the or more steps.

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

OVERVIEW

The present disclosure describes systems and methods of facilitating trading of non-negotiable financial assets. Further, the present disclosure describes turbocharging blockchain for financial transactions and facilitates the creation of highly efficient and competitive digital markets, the ecosystem has developed tokens and smart contract systems. When combined with blockchain technology, they can customize derivative investment vehicles.

Further, the present disclosure describes a method to facilitate the creation of highly efficient and competitive digital markets using blockchain technology. Further, the method may develop tokens and smart contract systems. Further, the tokens and smart contract systems may be combined with the blockchain technology, resulting in customized derivative investment vehicles. Further, the ability to deploy tokens and smart contracts at a low cost on public infrastructure may become economically feasible to represent real-life assets in a digital way. Further, examples of the method may include whole and fractional ownership of certificates of deposits and money market accounts.

Further, the present disclosure implements the blockchain technology for facilitating trading of non-negotiable financial assets. Further, the blockchain technology may cheaply and securely monetize non-negotiable assets when deployed with tokens and smart contract systems. Further, monetizing assets may unleash a hundred billion-plus greater wealth returns annually for retail and institutional depositors. Further, the ability to monetize, leverage, and hedge deposit accounts may incentivize depositors to maintain higher balances in deposit accounts.

Further, the present disclosure describes non-negotiable bank deposit. Further, the non-negotiable bank deposit may be a certificate of deposit (CD). Further, the certificate of deposit (CD) may be a savings account holding a fixed amount of money for a specified time, like six months or five years, and in exchange, the issuing bank pays interest. Further, banking institutions like FDIC and NCUA may only issue insured certificate of deposits (CDs). Further, a bank account must be opened to purchase a certificate of deposit. Further, the physical certificate of deposit may be kept in the bank's vault. Further, the depositor may receive a safekeeping receipt (trade confirmation). Further, the certificate of deposit is non-negotiable and may not be terminated before maturity without an Early Withdrawal Penalty (EWP). Further, the Early Withdrawal penalty may be assessed on all accrued interest and on a percentage of the principal deposit.

Further, the present disclosure describes a software application for the issuance and trade of derivates. Further, the software application may be CDXchange. Further, the CDXchange may be designed as an issuance and trading exchange for institutional and retail participants in the $6 trillion market of certificate of deposit (CD) and money market accounts (MMA) bank deposit. Further, the CDXchange may enable depositors and banks to monetize static, non-negotiable asset and liability banking products, such as the certificate of deposits (CDs) and money market accounts (MMAs). Further, the CDXchange harnesses the power of blockchain, tokens, and smart contracts. Further, the CDXchange may enable institutional and retail investors to hedge, leverage, and speculate the deposit products through derivatives like forwards and options called Depository Trading Receipts (DTRs). Further, banks may underwrite new issue FDIC/NCUA insured deposits on CDXchange. Further, the CDXchange may reduce the costs of obtaining funds for the banks.

Further, the present disclosure describes certificate of deposit (CD) market products. Currently, there are two categories of CD market products available for the investors. Further, the two categories of CD market products may include Direct Deposit CDs (DD) and Depository Trust Company CDs (DTC). Further, the Direct Deposit CDs (DD) are ubiquitous and may be opened on the branch level. Further, banks rely on the direct deposits to fund mortgages, car loans, credit card accounts, capital requirements, etc. Further, the Direct Deposit CDs may also be purchased through many online banking sites. Further, principal funds associated with the DDs may be FDIC insured up to $250 k per IRS tax/ss #number. Further, a rate associated with the DDs may be guaranteed for the term of the CD. Further, interest associated with the DDs may be paid monthly via ACH, bank check, or wire transfer. Further, the DDs may be non-transferable. Further, a user may be unable to take advantage of interest rate fluctuations, vis-à-vis asset appreciation. Further, the DDs may be associated with reinvestment rate risk. Further, the CDs generally cannot be terminated before maturity. If termination is possible, a significant Early Withdrawal Penalty (EWP) may be used, anywhere from 3 months of interest to all interest earned for the CD term.

Further, the Depository Trust Company (DTC) CDs are custodial, securitized "master certificates" purchased by brokers or dealers as a block. Further, the Depository Trust Company (DTC) CDs may be sold as fractionalized CDs to investors. Further, an issuing bank need only create one CD. Further, the issuing bank forwards interest payments to DTC, which credits CD owners through book entry. Further, the DTC CDs may be simple to purchase if a user has an investment account at a broker/dealer, i.e., TD Ameritrade—expensive underwriting fees for the Issuer. Further, a secondary market may be limited to a handful of brokers/dealers. Further, virtually no efficient marketplace may be present. Further, selling concession fees cannibalize investors' coupons.

Currently, the CD is an unremarkable product for the investor. Further, the issuers may underwrite faster and cheaper certificate of deposits on the CDXchange and virtually no operations staff are required to service CDs. Further, the investors earn higher yields, with greater asset product flexibility on CDXchange.

Further, the present disclosure describes the process of creating derivatives and issuing new CDs on CDXchange.

Further, the process may require technologies like blockchain, tokenization, smart contracts, oracles, custodian account, etc.

Further, the blockchain associated with the CDXchange is a digital ledger of data typically managed by a peer-to-peer network for use as a publicly distributed ledger. Further, the nodes of the network collectively adhering to a protocol to communicate and validate new blocks securely through cryptography. Further, the CDXchange utilizes the Algorand blockchain ecosystem.

Further, the tokenization associated with the CDXchange converts the value stored in a physical object, like a painting, or an intangible thing, like a carbon credit, into a token that may be manipulated along with a blockchain system. Further, CDXchange may use CDCoin as the currency accepted for all fees and transactions.

Further, the smart contract associated with the CDXchange is a computer protocol intended to digitally facilitate, verify, or enforce the negotiation or performance of an agreement. Further, smart contracts allow the execution of verifiable transactions without intermediaries.

Further, the oracles associated with the CDXchange may be a type of smart contract. Further, the oracles may take data from the outside world and put it into the blockchain for other smart contracts to act on. Further, Chainlink may provide oracle services to the CDXchange.

Further, the custodian account associated with the CDXchange may be a financial account. Further, the financial account may be set up for the benefit of CDXchange users and administered by multiple FDIC/NCUA-insured institutions. Further, the custodian account may be used for retail accounts that open a trading account directly with CDXchange. Further, the CDXchange may use Avanti as a CDCoin custodian.

Further, the present disclosure describes the foundations of the CDXchange. Further, the CDXchange is built upon Proof-of-Stake (POS) and permissioned co-chain blockchains, wherein a committee of verifiers agrees and signs every new block of transaction. Further, the block of transactions may be validated, propagated, and stored by all users in the network.

Further, the present disclosure describes the Proof-Of-Stake (POS) protocol. Further, the Proof-Of-Stake protocols are blockchains that work by selecting validators in proportion to their stake in the associated cryptocurrency. For a blockchain transaction to be recognized, it must be appended to the blockchain. Further, validators, also called foragers may carry out the appending and may receive a reward. Further, PoS blockchains remain secure by requiring the validators to have some 'tokens staked.' Further, with staking tokens, a user locks their tokens into the POS blockchain. Further, the tokens may be used to achieve consensus to keep the network secure while validating every new transaction on the blockchain. Further, by offering their tokens, validators may be rewarded with new coins from the network. Further, the rewards and validation power may be proportionate to the number of tokens staked. the higher the number staked, the greater the validation power. While the staking rules vary by network, the following are meant to give a general idea of a staking agreement:

1. The staker agrees that they'll only validate valid transactions on the network. I.e., they will not vote to approve double-spend transactions.
2. In exchange for approving valid transactions, the network rewards the staker with a staking reward, usually a PoS token in proportion to the 3. If a staker votes to approve illegal transactions, they may lose some or all of their stake.

Further, the present disclosure describes Algorand proof-of-stake consensus protocol blockchain. Further, the CDXchange may be built on Algorand proof-of-stake consensus protocol blockchain. Further, Algorand consensus mechanism is a permissioned co-chain and ensures full participation, protection, and speed within a truly decentralized network. With blocks finalized in seconds, Algorand transaction throughput is par with large payment and financial networks. Further, Algorand is the first blockchain to provide immediate transaction finality.

Further, the present disclosure describes the implementation of Algorand Smart Contracts and Chainlink Oracles. Further, the CDXchange may employ Algorand smart contracts and Chainlink oracles to run the attributes of every DTR and CDXCD validated on the blockchain. Further, the Algorand smart contracts (ASC1) are trusted, seamless, faster, scalable, and cost-effective solutions for sophisticated and complex applications. Further, smart contracts may embed contractual clauses (such as puts, calls, maturities, buy, sells, if-then scenarios and logic, etc.). Further, the CDXchange prevents any breach of the contract while efficiently acting on system orders and the attributes of those trades. Further, the smart contracts reference the orders and trades in a dynamic proactively enforced form and provide much better observation and verification Algorand's documentation states it best . . . 'Algorand's Smart Contracts (ASC1s) are trustless programs that execute on-chain, where users can be confident that the program was run without error and the results were not tampered with. They are integrated into Algorand's Layer-1, inheriting the same powerful speed, scale, finality, and security as the Algorand platform itself, and are cost-effective and error-free. ASC1s can automatically enforce custom rules and logic, from simply defining how assets can be transferred to complex application logic and flow. ASC1s are written in a new language called Transaction Execution Approval Language (TEAL) as well as PyTeal, a python language binding.'

Algorand Functionality:
  Stateless and Stateful implementation, with stateless executing transactional approvals while stateful, allows for complex applications using TEAL.
  Scalable, secure, and fast execution are not currently possible on legacy platforms. ASC1s operate at over 1,000 TPS and are final in under 5 seconds on a platform that is verified not to fork.
  Reduced risk with instant settlement through trustless execution.
  Low cost to execute with transactions with the same fee as any other transaction on the Algorand blockchain at 0.001 Algos.
  Low barrier to entry and increased speed to market with easier development and simplified templates for Stateless Smart Contracts and examples of different complex custom dApp for Stateful Smart Contracts (i.e., DTRs and CDXCDs).
  Flexible implementation where ASC1s can be applied to specific transactions, all transactions from an account, or fully powerful rich dApps.

Further, the present disclosure describes functions of Algorand. Further, the Algorand may be scalable and secure but fast execution may not be possible on legacy platforms currently. Further, the Algorand smart contract may operate at over 1,000 TPS and finalize in under 5 seconds on a platform that is verified not to fork. Further, the Algorand provides reduced risk with instant settlement through trustless execution. Further, the Algorand delivers low-cost transactions with the same fee as any other transaction on the Algorand blockchain at 0.001 Algos. Further, the Algorand provides a low barrier to entry and increased speed to market with easier development and simplified templates for Stateless Smart Contracts and complex custom dApp for Stateful Smart Contracts (i.e., DTRs and CDXCDs). Further, the Algorand smart contract may be applied to specific transactions or all transactions from an account, or fully powerful rich dApps.

Further, the present disclosure describes the functions of Chainlink. Further, the CDXchange utilizes Chainlink for the oracle smart contracts. Further, the Chainlink makes off-chain, real-world data usable on the Algorand smart contract. Further, the Chainlink connects smart contracts with external data using its decentralized oracle network. Further, Chainlink API requests may be handled 1:1 by an oracle. Further, with on-chain aggregation, data is aggregated from a decentralized network of independent oracle nodes. Further, the Chainlink ability to connect with any API and perform any off-chain computation may open up a wide variety of derivative products that may be built on CDXchange.

Further, the present disclosure describes tokenization on the CDXchange Decentralized ledgers require incentives to bring individual infrastructure providers (nodes) together to perform a shared objective (coordination services) in a highly secure and reliable manner. The incentives have to be sufficiently high because decentralized computation is purposely inefficient to lower the barrier to entry and generate strong determinism. Users will not pay to use a network that doesn't exist or is insecure, and node operators will not secure or operate a network if there are no paying users or revenue. Cryptocurrencies are defined as digital assets whose primary purpose is to serve as a medium of exchange (MoE) or a store of value (SoV). The words cryptocurrency, token, and crypto-asset will be used interchangeably and comprises any digital asset cryptographically secured and stored on a blockchain network.

Further, the present disclosure describes a bootstrapping of the CDXchange using a token. Further, the bootstrapping may require a debt-free native crypto-asset (token) specifically for the network. Further, the native token may be used to fund the network's growth by making it a required component for the usage and security of CDXchange. Further, all users must acquire and gain exposure to the native token before using network services. Further, having a standardized payment medium for utilizing the network ensures that demand from users must flow through the token. Further, nodes may have a direct incentive to uphold the token's value by maintaining the health of the network.

Further, the present disclosure describes a CDCoin as the native network token. Further, the CDCoin may be the native network token accepted by the CDXchange platform creating value in the open market. Further, the CDCoin benefits all parties in the value chain. Further, the development team may raise funds in a debt-free manner to support the network's development by allocating an initial portion of the token's supply to be sold to users in a token sale (e.g., Initial Coin Offering). Further, the CDXchange platform may bootstrap its growth by setting aside a large portion of the token's supply to be paid to network operators over time as a subsidy/block reward for securing the network. Further, the users receive the lowest cost for network services through built-in subsidies. Further, the nodes securing the network receive the highest rewards possible without value extraction by non-value-producing investors. Further, when the CDCoin value is directly tied to network demand from users, the value of the subsidy allocation increases alongside network adoption. Further, an increase in the subsidy allocation results in a larger budget for the network to leverage additional utility for users and incentivize more adoption.

Further, the present disclosure describes a growth cycle for the CDCoin network token. Further, the growth cycle may include issuing of CDCoin by a development team. Alongside its initial distribution method (public sale), a subsidy allocation may be created and held by the protocol development team. Further, the growth cycle may include a portion of the CDCoin subsidy allocation to be used to bootstrap the network's growth by rewarding infrastructure providers with the new tokens coming into circulation. Further, infrastructure providers may include liquidity providers, foragers, validators, etc. Further, the growth cycle may include the network subsidy resulting in the increase of the network utility for users (e.g., lower slippage trades, more secure network, additional services, etc.). Further, the increase in the network utility may lead to an increase in adoption and other fees paid by users to infrastructure operators. Further, the growth cycle may include generating more market demand for CDCoin. Further, the increased network usage may generate more market demand for CDCoin, culminating in a higher valuation of the native token's market capitalization. Further, the rise of the token's value on the market directly leads to a surge in the value of the remaining subsidy allocation, extending the per-unit ability of the tokens to grow the network further. Further, the rise of the token's value may enable more reinvestment into the network to stimulate additional network utility, greater user demand, and larger pools of user fees, accelerating the growth cycle once more.

Further, the present disclosure describes a benefit of token subsidization. Further, the token subsidization may bootstrap the supply side of the ecosystem in a debt-free manner before the demand side exists. Once the network's supply side is sufficient, then the demand side may naturally arise as CDXchange creates real network utility. Further, as the demand side rises via paying users, the subsidy may gradually be reduced until, eventually, the network becomes self-sustainable entirely from the aggregation of user fees. Further, the remaining subsidies may then be redirected towards other network initiatives to generate more adoption, like expanding services or growing network security.

Further, the present disclosure describes two general product categories that the CDXchange can issue, buy and sell. Further, the two general product categories may include Native Insured Certificate of Deposits (NICDs) and Legacy Deposits (LD).

Further, there may be products issued and purchased on the CDXchange platform. Further, the products may include Native Insured Certificate of Deposits (NICDs) and Legacy Deposits (LDs). Further, the NICDs may include new issue certificates of deposits (CDs) created on the CDXchange platform. Further, the NICDs may be customized and programmed with almost limitless attributes and features to fit any investor's need. Further, the NICDs, by default are programmed to be transferable and fractionalized. Further, the CDXchange markets the NICDs as CDXCDs. Further, the NICDs may be created and issued on a blockchain. Further, the NICDs may be transferable and mark-to-market. Further, the NICDs may be issued by an insured bank or credit union. Further, FDIC/NCUA may insure the NICDs to $250 k per account. Further, derivatives may be created on CDXchange from CDXCDs after first settling. Further, the LDs may be CDs and money market accounts (MMAs). Further, the CDs and MMAs may be seasoned and currently held at individual banks and credit unions. Further, the LDs may be custodial before registering in the CDXchange. Further, a deposit account holder may execute a custodial account agreement. Further, a CDXchange custodian may initiate the transfer of title, and update interest and principal payment account information with the issuing bank.

Further, the present disclosure describes the Native Insured CDs. Further, the NICDs are new issue CDs created on the CDXchange platform. Further, the NICDs may be customized and programmed with almost limitless attributes and features to fit any investor's need. Further, the NICDs, by default are programmed to be transferable and fractionalized. Further, the CDXchange markets the NICDs as CDXCDs.

Further, the present disclosure describes the Legacy Deposits (LDs). Further, the Legacy Deposits originate off-chain and within normal distribution channels such as branches, and on-line. Further, Legacy Deposits are non-transferable and are not registered with any clearing exchange. Further, custodial registration and block creation may monetize LDs by creating derivative products. Further, cashflows and principal fractionalization are 'sold off' in synthetic financial products collateralized by 100% FDIC/NCUA insured CDs.

Further, the present disclosure describes the derivative products and structured financial instruments known as Deposit Trading Receipts (DTRs). Further, the DTRs derive their risk-free AAA rating from FDIC/NCUA Insured Certificates of Deposits held with U.S. Banks and Credit Unions. Further, DTRs are issued as Smart Contracts built on the Marlowe programming language on the Sterling Token.

Further, the present disclosure describes several CDXchange products associated with the CDXchange platform. Further, the CDXchange products include CDXCDs, Arbitrage Certificates (ArbCert), Monetize Certificates (Mert), Forward Certificates (FaC's), Options on Certificate of Deposits (OpCoDs), and Certificate of Holding Interest and Principal Shares (CHIPS).

Further, the present disclosure describes the CDXCDs product. Further, the CDXCDs product combines the best features of Direct Deposits CDs like syndication, transferability, quick settlement, etc. Further, the CDXCDs product combines the best features of Depository Trust Company CDs like higher coupons, interest payment flexibility, etc. Further, the CDXCDs may be issued directly from the CDXchange platform, and the Algorand Smart Contracts handle all interest payments, CD attributes, maturities, and transfers.

Further, the present disclosure describes the Arbitrage Certificates (ArbCert) product. Further, the Arbitrage may be used whenever any asset may be purchased in one market at a given price and simultaneously sold in another market at a higher price. Further, the situation creates an opportunity for a risk-free profit for the speculator. Further, Arbitrage provides a mechanism to ensure that prices do not deviate substantially from fair value for long periods. Further, many traders have computerized trading systems set to monitor fluctuations in similar financial instruments. Any inefficient pricing setups may be acted upon quickly, and the opportunity is eliminated in a matter of seconds.

Further, in an instance of arbitrage, consider the following. Further, a speculator A notices a 5 Year CD with a coupon of 3%. This CD is 0.5% above the average current market rate of 2.5% for a five-year CD. The speculator may buy the CD from Bank A with a 3% coupon and immediately sell the CD through CDXchange at 2.5%, earning the spread. The speculator may continue to exploit this arbitrage until Bank A runs out of inventory or until Bank A lowers the national average or the national rate.

Further, the present disclosure describes the Monetize Certificates (Mert) product. Further, there are instances where issuers may just want to monetize one CD position or their entire portfolio by reselling all cashflows for specific periods. Further, without the DTR Monetize product, the issuer would have to accept an early withdrawal penalty from the issuing bank. Further, the issuers may want to sell a CD position for many reasons. Further, the issuer may believe that higher returns could be had in other financial instruments. Further, in some cases, the issuer may need to raise cash for liquidity purposes.

Further, the present disclosure describes the Forward Certificates (FaCs) product. Further, the Forward Certificates help investors and receivers plan for future events where funds will be required. Further, an investor will have funds available to purchase a CD in 6 months and may be worried that rates may fall. Further, the investor may buy a Forward or Future rate and lock in a rate for settlement six months from now. For this, a Forward Certificate contract may be made between at least two parties. Further, the contract may be standardized or customized. Further, the contract may carry a premium.

Further, the present disclosure describes the Options on Certificate of Deposits (OpCoDs) product. Further, OpCoDs allow the Investor to Opt-out (the issuer still earns a premium) regardless of the interest rate environment and enable the investor to sell the OpCoDs before the excise date. Further, OpCoDs may allow receivers to generate valuable non-interest income while allowing investors to hedge their savings and investment accounts. Further, an investor who believes that interest rates may fall in the next three months can buy the 'Option' to purchase a forward rate on a specified date with a specific term. Further, a receiver earns a fee for every OpCert created. Further, the receiver may hedge issued CDs, mortgages, savings accounts, etc. Further, the investor may buy protection against falling rates. Further, the investor speculates on the value of the contract and may sell it before the excise date.

Further, the present disclosure describes the Certificate of Holding Interest and Principal Shares (CHIPS) product. Further, CHIPS are created when a CD's coupons are separated from the CD. Further, the separated CD may be sold to an investor at a discount price. Further, the difference between the discount price and the CD's face value at maturity is the investor's profit. Further, the coupons become separate investments that may be sold separately. Further, the CHIPS may be issued and insured by FDIC and NCUA institutions. Further, the CHIPS cannot be purchased directly from banks or credit unions and may only be bought on CDXchange. Further, the CHIPS are a popular choice for fixed-income investors as they have higher returns than Treasury strips and are FDIC/NCUA insured. Since CHIPS are sold at a discount, investors do not require a large stash of cash to purchase them. Assuming the CHIPS are held to maturity, the investors know the actual payouts they will receive. Further, the CHIPS also offers a range of maturity dates since they are based on the dates of the interest payments. Further, if an investor wants to sell a CHIPS before its maturity, the market has enough liquidity to accommodate the transaction.

Further, the process of detaching the interest payments from the CD may be called coupon stripping. The coupons become individual securities, with the principal payments due at maturity. No interim coupon payments may be made along the way. For instance, a 2-year CD with a $100,000 face value and a 2% annual interest rate may be stripped. Assuming it initially pays coupons semi-annually, five zero-coupon bonds may be created, including the CD itself. Each stripped coupon has a $1000 face value, which is the amount of each coupon, and the last coupon may be the principal face of the CD, in this instance, $100,000. All five securities may be distinct and may be traded separately in the market with FDIC insurance.

FIG. 1 is an illustration of an online platform 100 consistent with various embodiments of the present disclosure. By way of non-limiting example, the online platform 100 for facilitating trading non-negotiable financial assets may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 200.

Figure 2:
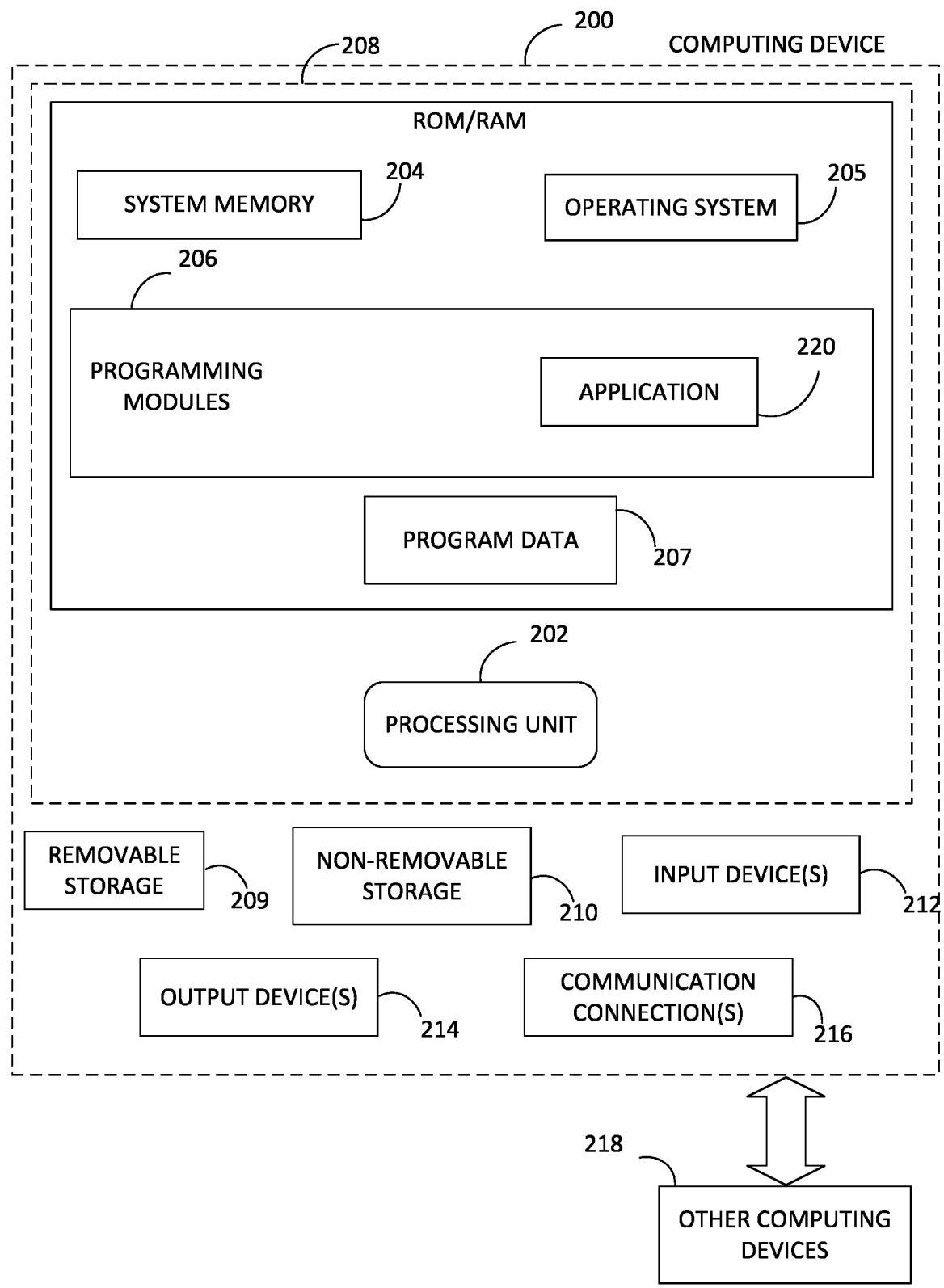
FIG. 2 is a block diagram of a computing device for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
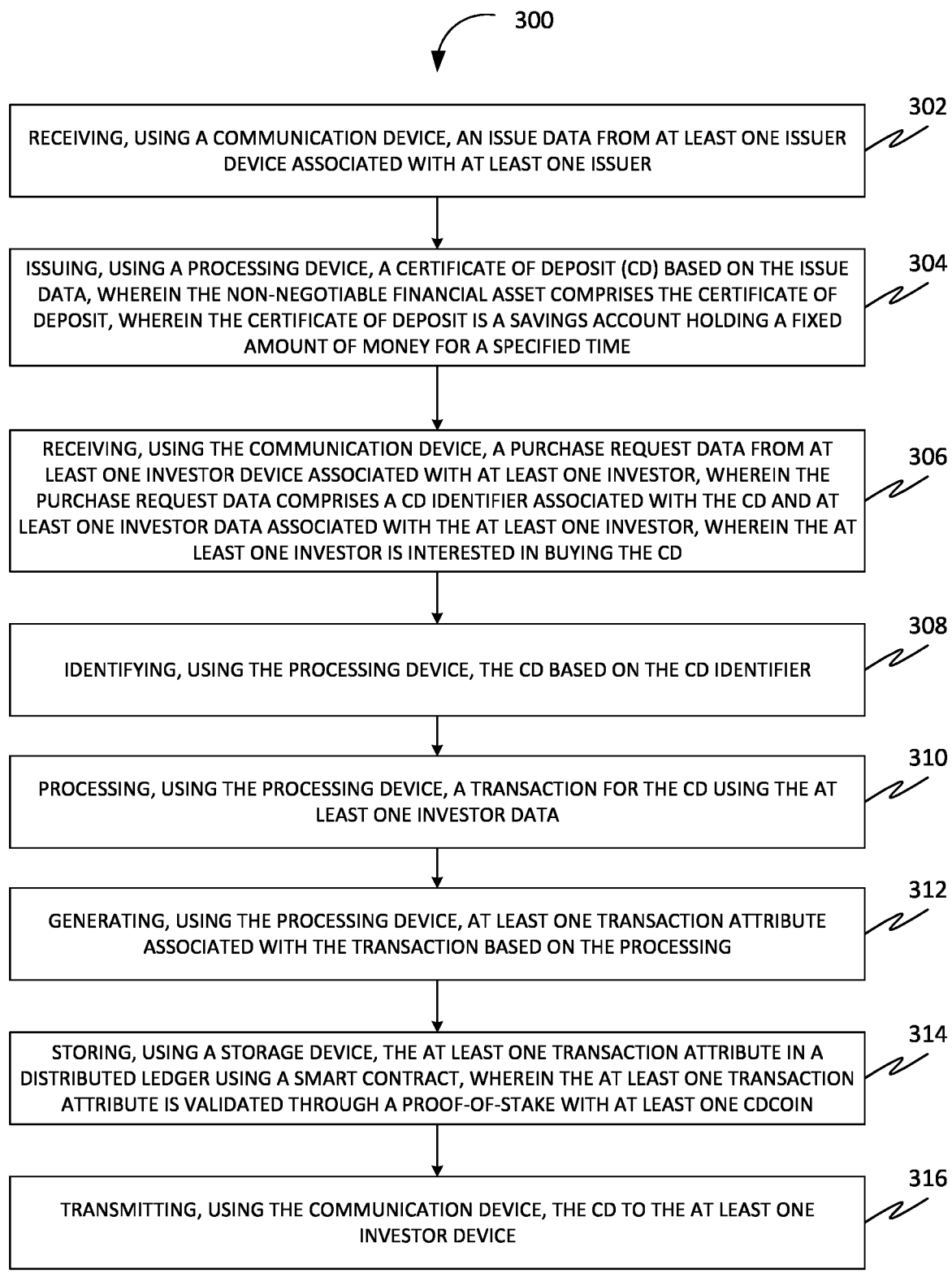
FIG. 3 illustrates a flowchart of a method of facilitating trading non-negotiable financial assets, in accordance with some embodiments.

FIG. 3 illustrates a flowchart of a method 300 of facilitating trading non-negotiable financial assets, in accordance with some embodiments. Accordingly, the method 300 may include a step 302 of receiving, using a communication device 902, an issue data from at least one issuer device (such as one or more issuer devices 1002-1004) associated with at least one issuer. Further, the method 300 may include a step 304 of issuing, using a processing device 904, a certificate of deposit (CD) based on the issue data. Further, the non-negotiable financial asset may include the certificate of deposit. Further, the certificate of deposit may be a savings account holding a fixed amount of money for a specified time. Further, the method 300 may include a step 306 of receiving, using the communication device 902, a purchase request data from at least one investor device (such as one or more investor devices 1006-1008) associated with at least one investor, wherein the purchase request data comprises a CD identifier associated with the CD and at least one investor data associated with the at least one investor, wherein the at least one investor is interested in buying the CD. Further, the method 300 may include a step 308 of identifying, using the processing device 904, the CD based on the CD identifier. Further, the method 300 may include a step 310 of processing, using the processing device 904, a transaction for the CD using the at least one investor data. Further, the method 300 may include a step 312 of generating, using the processing device 904, at least one transaction attribute associated with the transaction based on the processing. Further, the method 300 may include a step 314 of storing, using a storage device 906, the at least one transaction attribute in a distributed ledger using a smart contract, wherein the at least one transaction attribute may be validated through a proof-of-stake with at least one CDCoin. Further, the method 300 may include a step 316 of transmitting, using the communication device 902, the CD to the at least one investor device.

Further, in some embodiments, the method 300 may include receiving, using the communication device 902, a portfolio data associated with a portfolio of the at least one investor from the at least one investor device. Further, the portfolio data may include at least one CD information corresponding to at least one CD that may be already purchased by the at least one investor. Further, the method 300 may include receiving, using the communication device 902, issuer data from the at least one issuer device. Further, the issuer data may include a plurality of CD information associated with a plurality of CDs. Further, the plurality of CD information may include a period term, an interest payment information, and terms and conditions corresponding to the plurality of CDs. Further, the method 300 may include processing, using the processing device 904, the portfolio data and the issuer data using at least one artificial intelligence model. Further, the at least one artificial intelligence model may be based on at least one machine learning algorithm. Further, the method 300 may include generating, using the processing device 904, at least one portfolio optimization recommendation associated with the portfolio based on the processing of the portfolio data and the issuer data. Further, the method 300 may include transmitting, using the communication device 902, the at least one portfolio optimization recommendation to the at least one investor device. Further, the at least one portfolio optimization recommendation may provide a measure to the at least one investor to maximize returns based on purchasing of the at least one CD. Further, the method 300 may include storing, using the storage device 906, the at least one portfolio optimization recommendation on the distributed ledger.

Further, in some embodiments, the method 300 may include receiving, using the communication device 902, a selection corresponding to the at least one CD from the at least one investor device. Further, the selection may include the CD identifier. Further, the identifying of the at least one CD may be based on the selection. Further, in some embodiments, the issuer data may include market data that may reflect financial market conditions. Further, the method 300 may include determining, using the processing device 904, at least one interest information based on the processing of the portfolio data and the issuer data and the market data. Further, the at least one interest information may include a predicted interest return in a future market condition. Further, the interest return may be received by the at least one investor upon purchasing at least one CD of the plurality of CDs when the at least one CD matures. Further, the method 300 may include transmitting, using the communication device 902, the at least one interest information to the at least one investor device. Further, the selection received from the at least one investor device may be based on the at least one interest information.

Figure 4A:
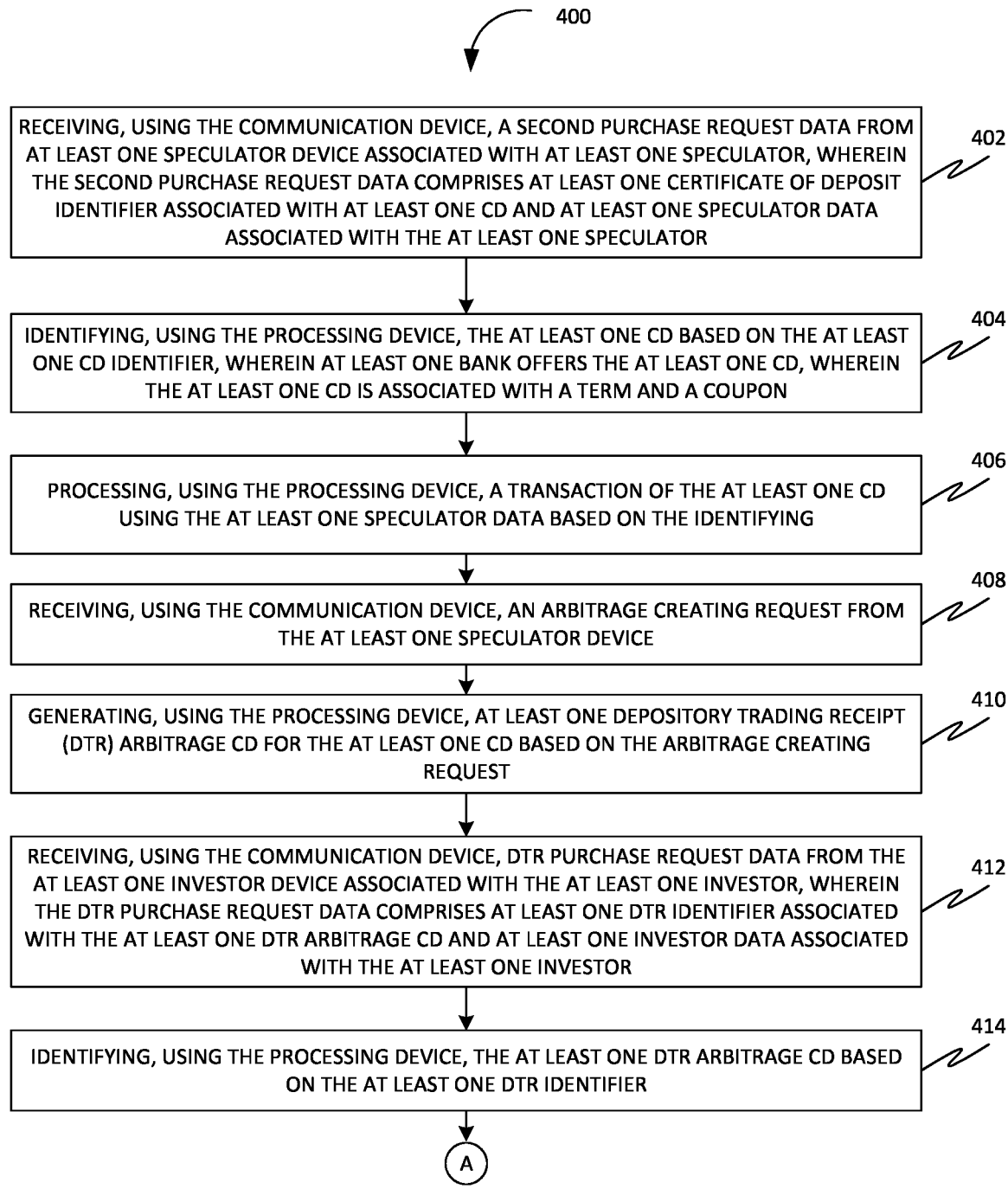
FIG. 4A illustrates a flowchart of a method of facilitating trading non-negotiable financial assets, in accordance with some embodiments.
Figure 4B:
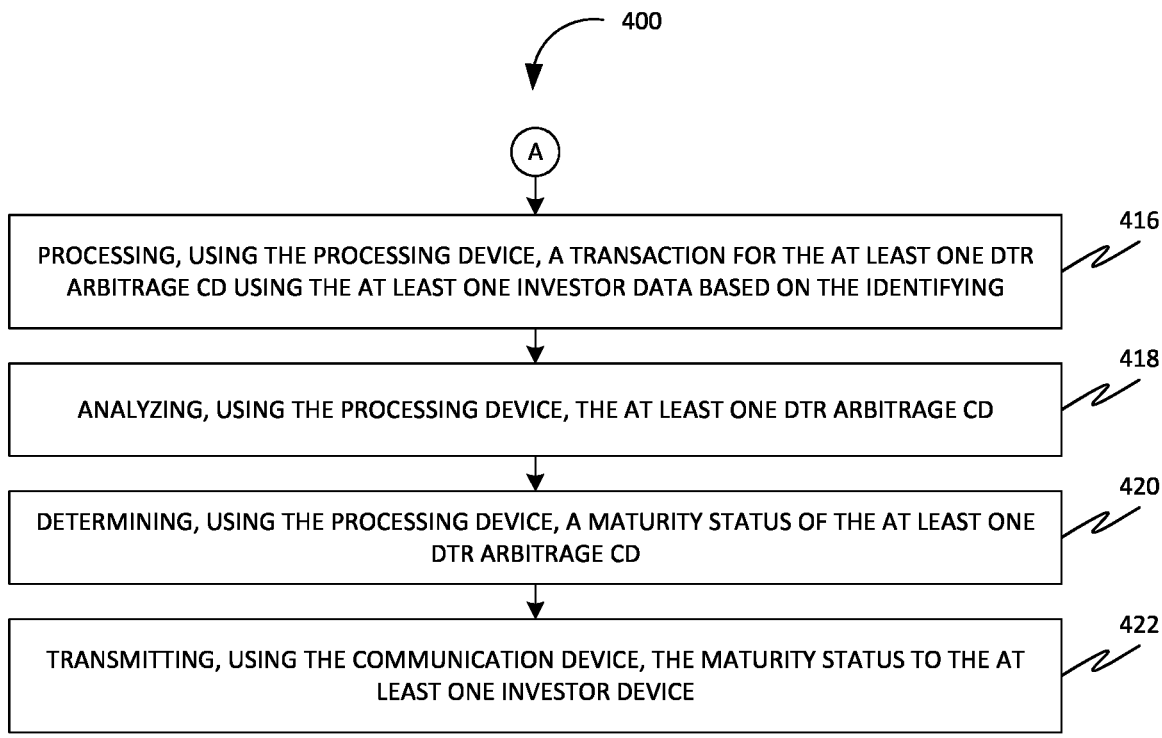
FIG. 4B illustrates a continuation of the flowchart of the method of facilitating the trading of the non-negotiable financial assets, in accordance with some embodiments.

FIG. 4A and FIG. 4B illustrate a flowchart of a method 400 of facilitating trading non-negotiable financial assets, in accordance with some embodiments. Further, the method 400 may include a step 402 of receiving, using the communication device 902, a second purchase request data from at least one speculator device (such as one or more speculator devices 1010-1012) associated with at least one speculator, wherein the second purchase request data comprises at least one certificate of deposit identifier associated with at least one CD and at least one speculator data associated with the at least one speculator.

Further, the method 400 may include a step 404 of identifying, using the processing device 904, the at least one CD based on the at least one CD identifier, wherein at least one bank offers the at least one CD, wherein the at least one CD is associated with a term and a coupon Further, the method 400 may include a step 406 of processing, using the processing device 904, a transaction of the at least one CD using the at least one speculator data based on the identifying. Further, in some embodiments, the method 400 may include a step 408 of receiving, using the communication device 902, an arbitrage creating request from the at least one speculator device. Further, the method 400 may include a step 410 of generating, using the processing device 904, one or more Depository Trading Receipts (DTR) Arbitrage CD for the one or more CDs based on the arbitrage creating request. Further, the method 400 may include a step 412 of receiving, using the communication device 902, DTR purchase request data from the at least one investor device associated with the at least one investor, wherein the DTR purchase request data may include at least one DTR identifier associated with the at least one DTR Arbitrage CD and at least one investor data associated with the at least one investor.

Further, the method 400 may include a step 414 of identifying, using the processing device 904, the at least one DTR Arbitrage CD based on the at least one DTR identifier. Further, the method 400 may include a step 416 of processing, using the processing device 904, a transaction for the at least one DTR Arbitrage CD using the at least one investor data based on the identifying. Further, the method 400 may include a step 418 of analyzing, using the processing device 904, the at least one DTR Arbitrage CD. Further, in some embodiments, the method 400 may include a step 420 of determining, using the processing device 904, a maturity status of the at least one DTR Arbitrage CD. Further, the method 400 may include a step 422 of transmitting, using the communication device 902, the maturity status to the at least one investor device.

In some embodiments, the method 400 may include creating, using the processing device 904, a second smart contract with one or more information associated with the one or more CDs based on the generating of the one or more DTR Arbitrage CDs. Further, the second smart contract may credit one or more principal payments and one or more interest payments into one or more accounts of the one or more investors based on the determining.

In some embodiments, the second smart contract may be appended with one or more new information based on the transaction for the one or more DTR Arbitrage CDs. Further, the second smart contract and the transaction for the one or more DTR Arbitrage CDs may be embedded onto the distributed ledger based on the processing.

Figure 5:
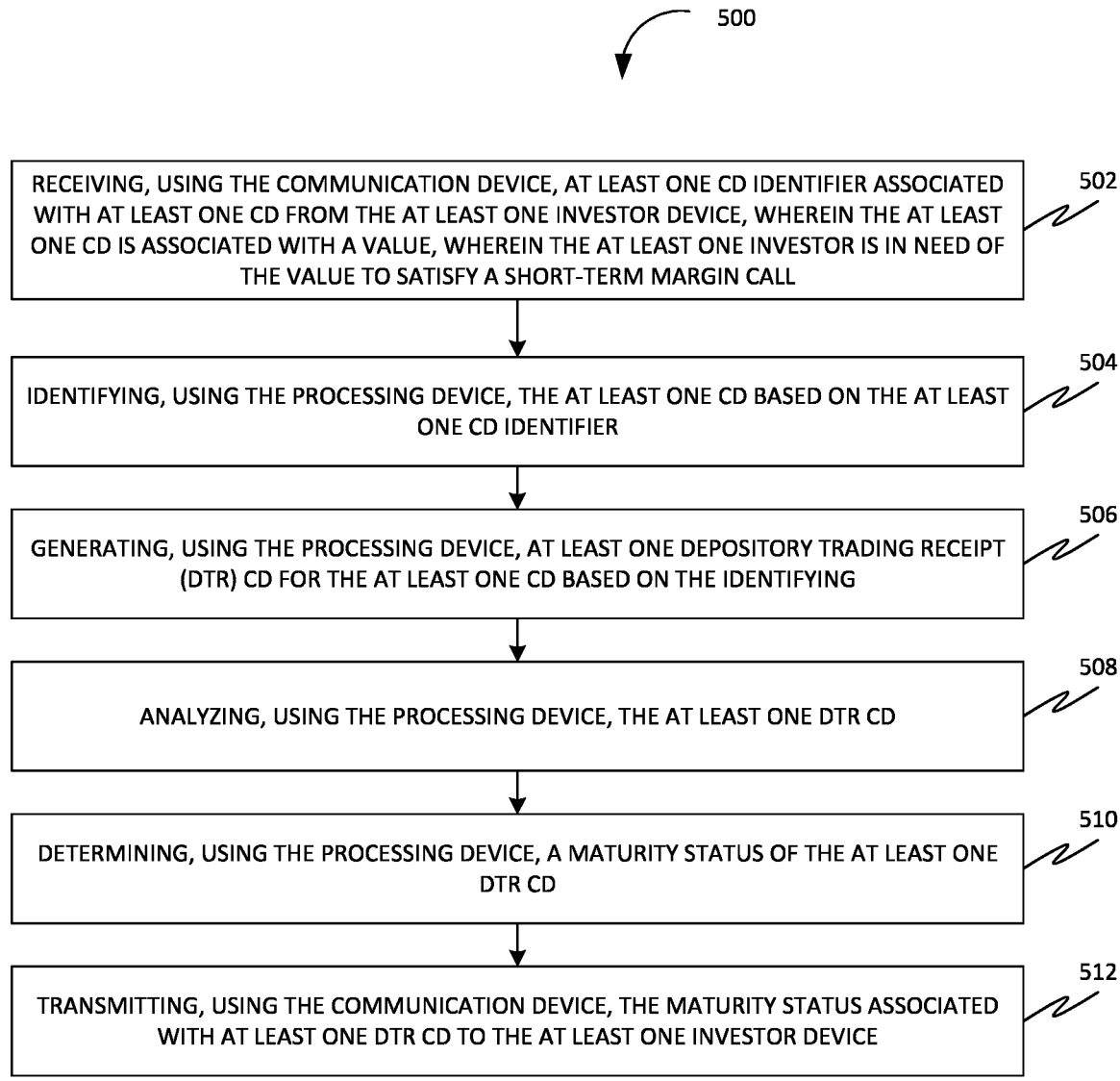
FIG. 5 illustrates a flowchart of a method of facilitating trading non-negotiable financial assets, in accordance with some embodiments.

FIG. 5 illustrates a flowchart of a method 500 of facilitating trading non-negotiable financial assets, in accordance with some embodiments.

Further, the method 500 may include a step 502 of receiving, using the communication device 902, at least one CD identifier associated with at least one CD from the at least one investor device, wherein the at least one CD is associated with a value, wherein the at least one investor is in need of the value to satisfy a short-term margin call. Further, the method 500 may include a step 504 of identifying, using the processing device 904, the at least one CD based on the at least one CD identifier. Further, the method 500 may include a step 506 of generating, using the processing device 904, one or more Depository Trading Receipt (DTR) CDs for the one or more CDs based on the identifying. Further, the method 500 may include a step 508 of analyzing, using the processing device 904, the at least one DTR CD. Further, the method 500 may include a step 510 of determining, using the processing device 904, a maturity status of the at least one DTR CD. Further, the method 500 may include a step 512 of transmitting, using the communication device 902, the maturity status associated with at least one DTR CD to the at least one investor device.

In some embodiments, the method 500 may include creating, using the processing device 904, a third smart contract with one or more information associated with the one or more CDs based on the generating of the one or more DTR CDs. Further, the third smart contract one or more of withdraws and credits at least one payment between two or more accounts based on the determining.

Figure 6:
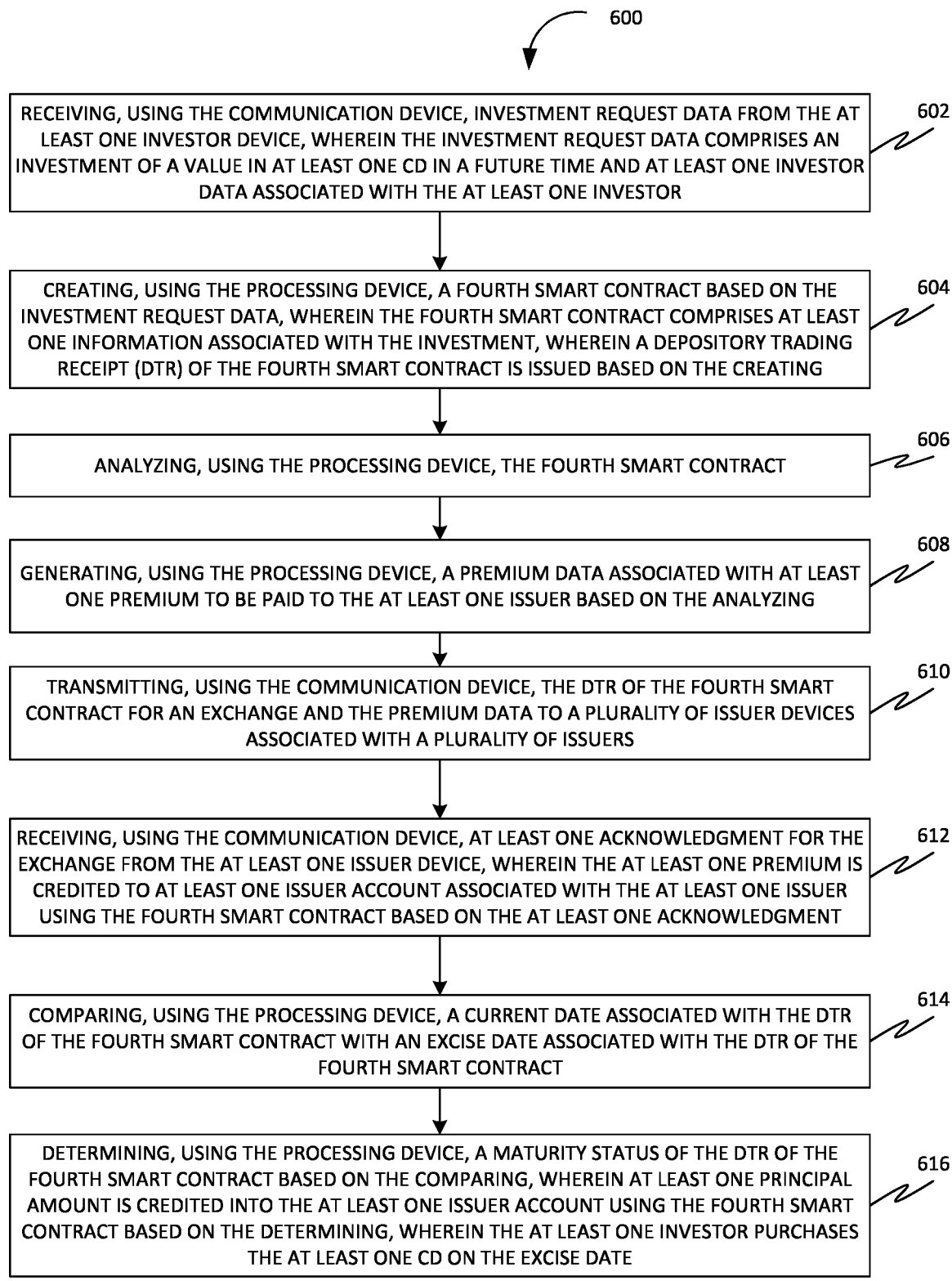
FIG. 6 illustrates a flowchart of a method of facilitating trading non-negotiable financial assets, in accordance with some embodiments.

FIG. 6 illustrates a flowchart of a method 600 of facilitating trading non-negotiable financial assets, in accordance with some embodiments. Further, the method 600 may include a step 602 of receiving, using the communication device 902, investment request data from the at least one investor device, wherein the investment request data comprises an investment of a value in at least one CD in a future time and at least one investor data associated with the at least one investor.

Further, the method 600 may include a step 604 of creating, using the processing device 904, a fourth smart contract based on the investment request data. Further, the fourth smart contract may include one or more information associated with the investment. Further, a depository trading receipt (DTR) of the fourth smart contract may be issued based on the creating.

Further, the method 600 may include a step 606 of analyzing, using the processing device 904, the fourth smart contract.

Further, the method 600 may include a step 608 of generating, using the processing device 904, a premium data associated with at least one premium to be paid to the at least one issuer based on the analyzing of the fourth smart contract.

Further, the method 600 may include a step 610 of transmitting, using the communication device 902, the DTR of the fourth smart contract for an exchange and the premium data to a plurality of issuer devices (such as one or more issuer devices 1002-1004) associated with a plurality of issuers.

Further, the method 600 may include a step 612 of receiving, using the communication device 902, at least one acknowledgment for the exchange from the at least one issuer device, wherein the at least one premium is credited to at least one issuer account associated with the at least one issuer using the fourth smart contract based on the at least one acknowledgment.

Further, the method 600 may include a step 614 of comparing, using the processing device 904, a current date associated with the DTR of the fourth smart contract with an excise date associated with the DTR of the fourth smart contract. Further, the method 600 may include a step 616 of determining, using the processing device 904, a maturity status of the DTR of the fourth smart contract based on the comparing, wherein at least one principal amount is credited into the at least one issuer account using the fourth smart contract based on the determining, wherein the at least one investor purchases the at least one CD on the excise date.

Figure 7A:
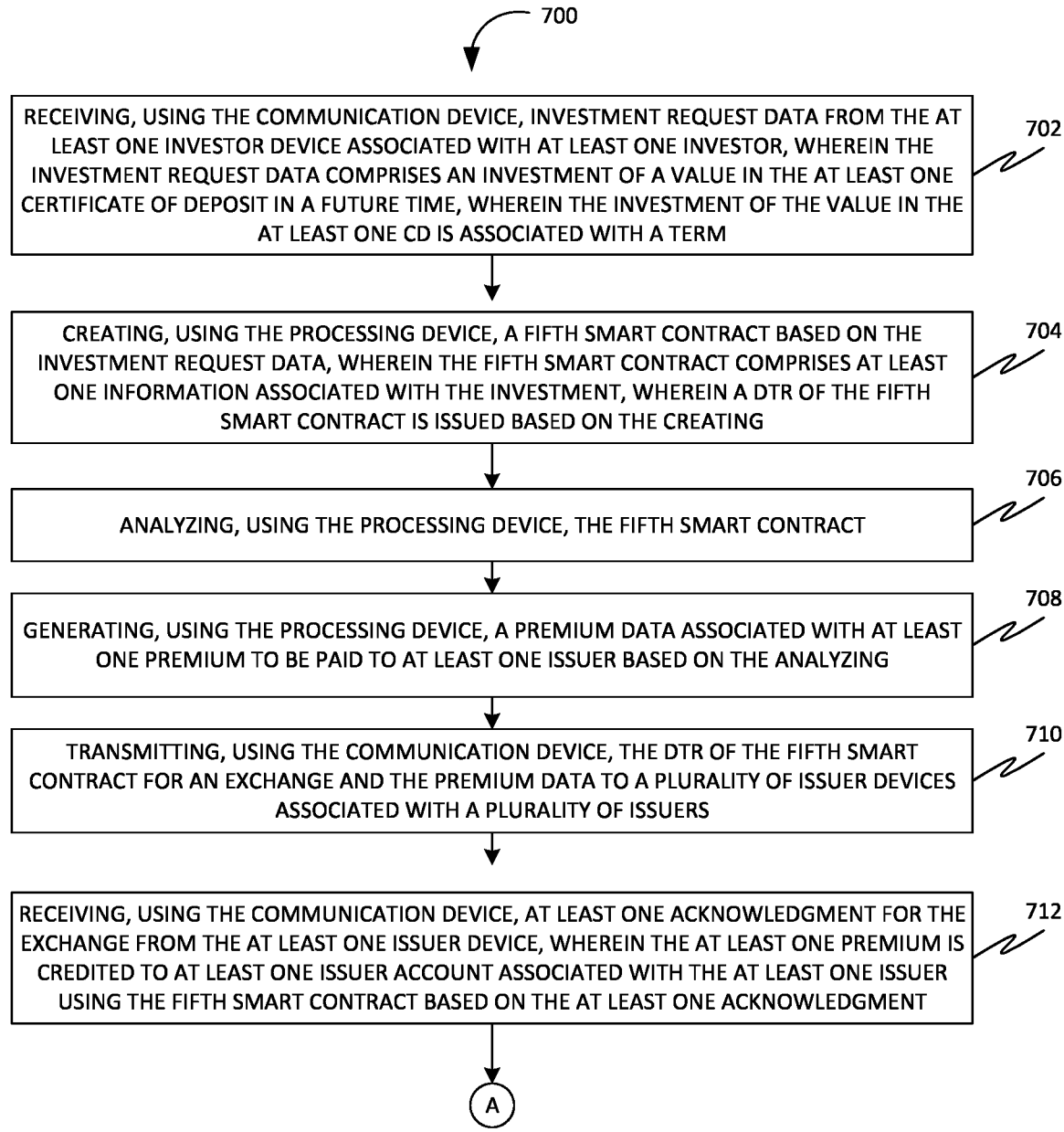
FIG. 7A illustrates a flowchart of a method of facilitating trading non-negotiable financial assets, in accordance with some embodiments.
Figure 7B:
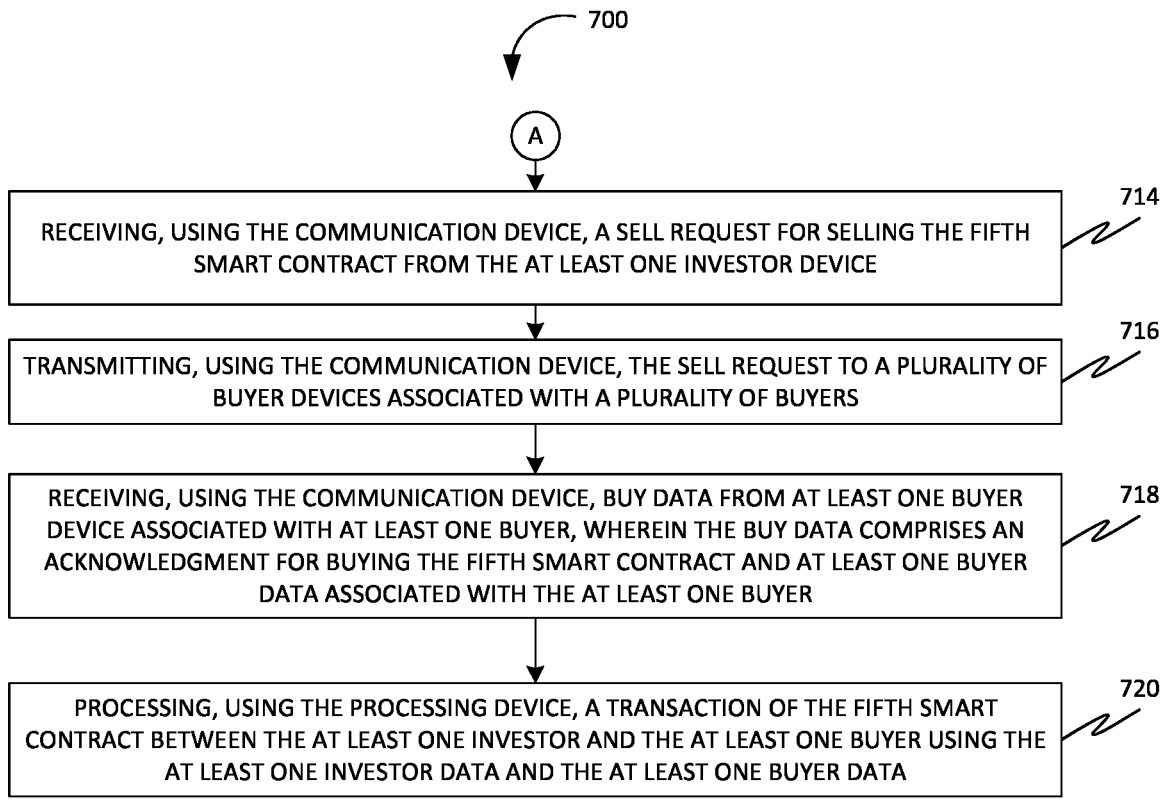
FIG. 7B illustrates a continuation of the flowchart of the method of facilitating the trading of the non-negotiable financial assets, in accordance with some embodiments.

FIG. 7A and FIG. 7B illustrate a flowchart of a method 700 of facilitating trading non-negotiable financial assets, in accordance with some embodiments.

Further, the method 700 may include a step 702 of receiving, using the communication device 902, a second investment request data from the at least one investor device associated with at least one investor, wherein the second investment request data comprises an investment of a value in the at least one certificate of deposit in a future time, wherein the investment of the value in the at least one CD is associated with a term. Further, the method 700 may include a step 704 of creating, using the processing device 904, a fifth smart contract based on the second investment request data, wherein the fifth smart contract comprises at least one information associated with the investment, wherein a DTR of the fifth smart contract may be issued based on the creating.

Further, the method 700 may include a step 706 of analyzing, using the processing device 904, the fifth smart contract. Further, the method 700 may include a step 708 of generating, using the processing device 904, a premium data associated with at least one premium to be paid to at least one issuer based on the analyzing of the fifth smart contract. Further, the method 700 may include a step 710 of transmitting, using the communication device 902, the DTR of the fifth smart contract for an exchange and the premium data to a plurality of issuer devices (such as one or more issuer devices 1002-1004) associated with a plurality of issuers. Further, the method 700 may include a step 712 of receiving, using the communication device 902, at least one acknowledgment for the exchange from the at least one issuer device, wherein the at least one premium is credited to at least one issuer account associated with the at least one issuer using the fifth smart contract based on the at least one acknowledgment. Further, the method 700 may include a step 714 of receiving, using the communication device 902, a sell request for selling the fifth smart contract from the at least one investor device. Further, the method 700 may include a step 716 of transmitting, using the communication device 902, the sell request to a plurality of buyer devices (such as two or more buyer devices 1014-1016) associated with a plurality of buyers. Further, the method 700 may include a step 718 of receiving, using the communication device 902, buy data from at least one buyer device associated with at least one buyer, wherein the buy data comprises an acknowledgment for buying the fifth smart contract and at least one buyer data associated with the at least one buyer. Further, the method 700 may include a step 720 of processing, using the processing device 904, a transaction of the fifth smart contract between the at least one investor and the at least one buyer using the at least one investor data and the at least one buyer data.

Figure 8:
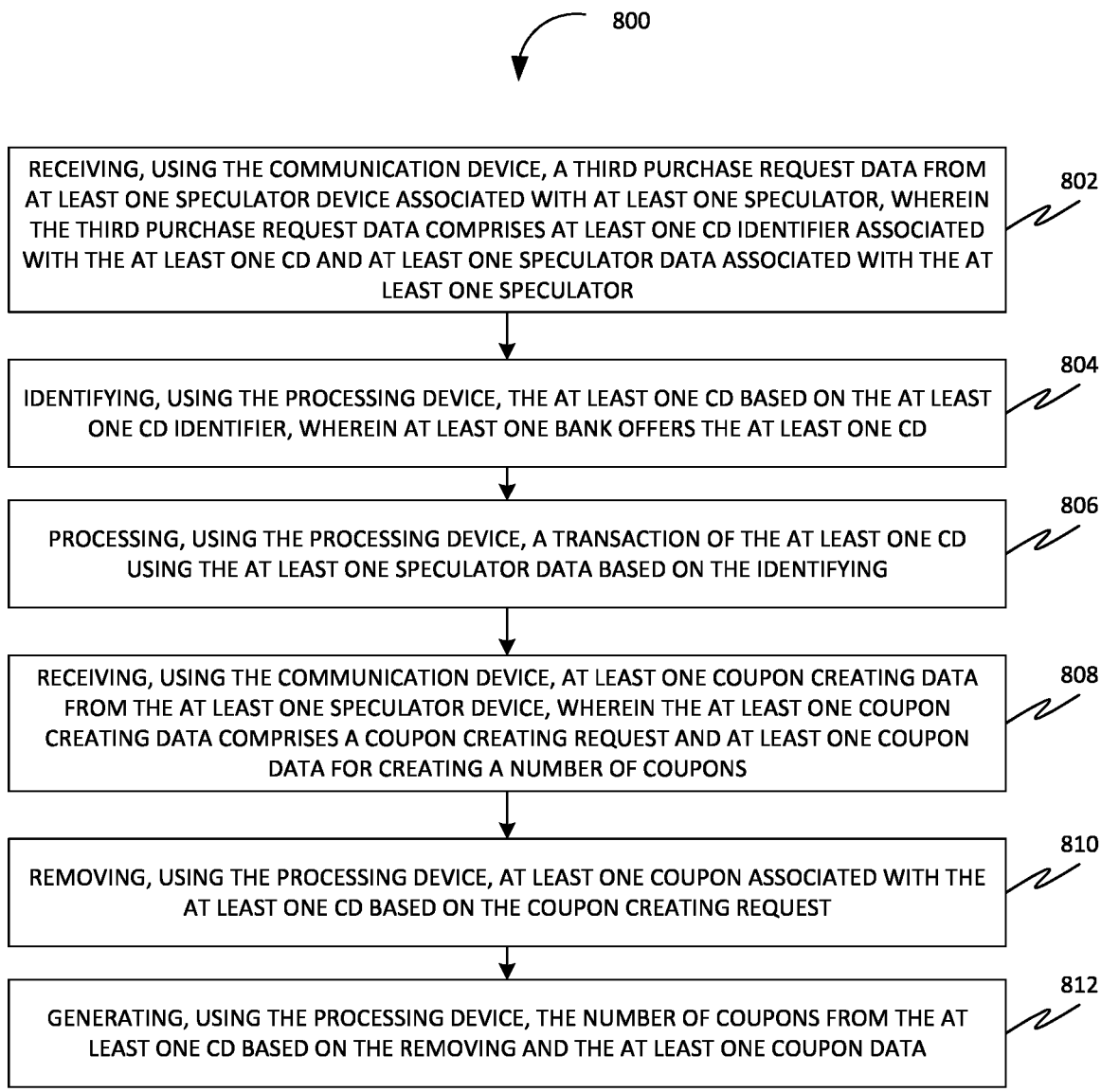
FIG. 8 illustrates a flowchart of a method of facilitating trading non-negotiable financial assets, in accordance with some embodiments.

FIG. 8 illustrates a flowchart of a method 800 of facilitating trading non-negotiable financial assets, in accordance with some embodiments. Further, the method 800 may include a step 802 of receiving, using the communication device 902, a third purchase request data from at least one speculator device associated with at least one speculator, wherein the third purchase request data comprises at least one CD identifier associated with the at least one CD and at least one speculator data associated with the at least one speculator. Further, the method 800 may include a step 804 of identifying, using the processing device 904, the at least one CD based on the at least one CD identifier, wherein at least one bank offers the at least one CD. Further, the method 800 may include a step 806 of processing, using the processing device 904, a transaction of the at least one CD using the at least one speculator data based on the identifying. Further, the method 800 may include a step 808 of receiving, using the communication device 902, at least one coupon creating data from the at least one speculator device, wherein the at least one coupon creating data comprises a coupon creating request and at least one coupon data for creating a number of coupons. Further, the method 800 may include a step 810 of removing, using the processing device 904, at least one coupon associated with the at least one CD based on the coupon creating request. Further, the method 800 may include a step 812 of generating, using the processing device 904, the number of coupons from the at least one CD based on the removing and the at least one coupon data.

In some embodiments, the method 800 may include creating, using the processing device 904, a sixth smart contract for each coupon of the number of coupons. Further, the sixth smart contract of each coupon of the number of coupons may be traded.

Figure 9:
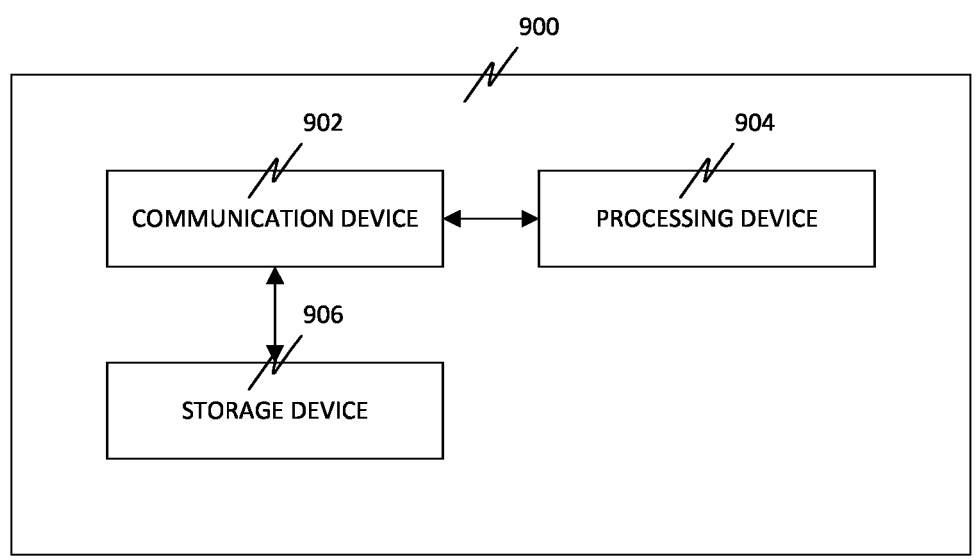
FIG. 9 illustrates a block diagram of a system of facilitating trading non-negotiable financial assets, in accordance with some embodiments.

FIG. 9 illustrates a block diagram of a system 900 of facilitating trading non-negotiable financial assets, in accordance with some embodiments.

Figure 10:
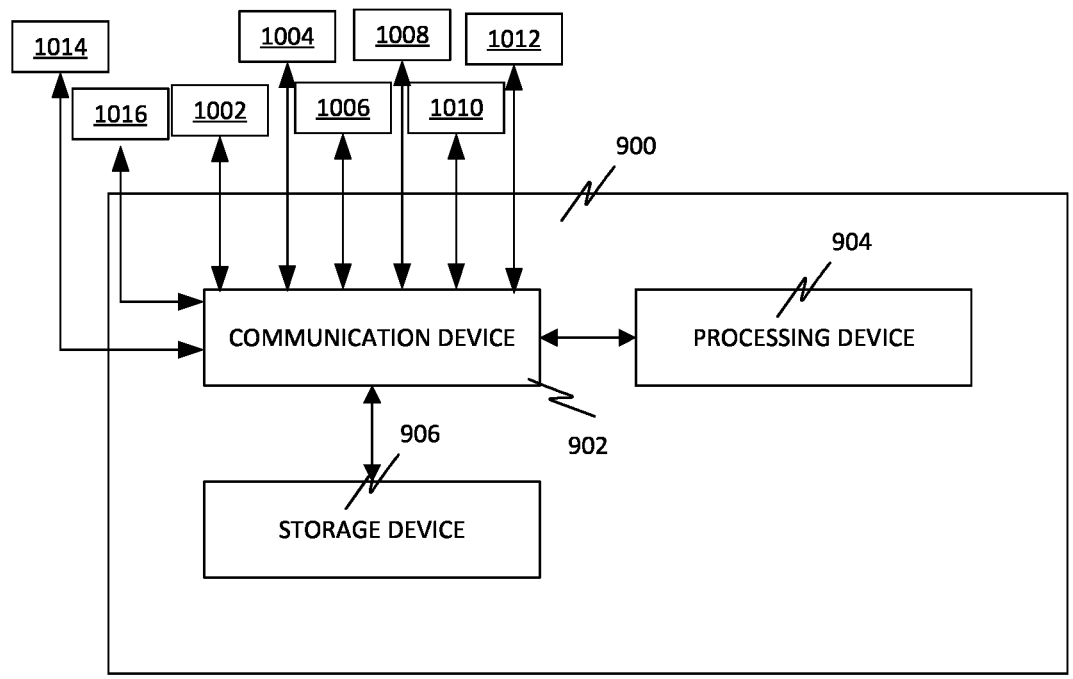
FIG. 10 is a block diagram of the system of facilitating the trading of the non-negotiable financial assets, in accordance with some embodiments.

Accordingly, the system 900 may include a communication device 902. Further, the communication device 902 may be configured for receiving an issue data from one or more issuer devices 1002-1004 (as shown in FIG. 10) associated with one or more issuers. Further, the communication device 902 may be configured for receiving a purchase request data from one or more investor devices 1006-1008 (as shown in FIG. 10) associated with one or more investors. Further, the purchase request data may include a CD identifier associated with a certificate of deposit and one or more investor data associated with the one or more investors. Further, the one or more investors may be interested in buying the CD. Further, the communication device 902 may be configured for transmitting the CD to the one or more investor devices 1006-1008. Further, the system 900 may include a processing device 904 communicatively coupled with the communication device 902. Further, the processing device 904 may be configured for issuing the CD based on the issue data. Further, the non-negotiable financial asset may include the certificate of deposit. Further, the certificate of deposit may be a savings account holding a fixed amount of money for a specified time. Further, the processing device 904 may be configured for identifying the CD based on the CD identifier. Further, the processing device 904 may be configured for processing a transaction for the CD using the one or more investor data. Further, the processing device 904 may be configured for generating one or more transaction attributes associated with the transaction based on the processing. Further, the system 900 may include a storage device 906 communicatively coupled with the communication device 902. Further, the storage device 906 may be configured for storing the one or more transaction attributes in a distributed ledger using a smart contract. Further, the one or more transaction attributes may be validated through a proof-of-stake with one or more CDCoins.

Further, in some embodiments, the communication device 902 may be configured for receiving a second purchase request data from one or more speculator devices 1010-1012 (as shown in FIG. 10) associated with one or more speculators. Further, the second purchase request data may include one or more certificates of deposit identifier associated with one or more CDs and one or more speculator data associated with the one or more speculators. Further, the communication device 902 may be configured for receiving an arbitrage creating request from the one or more speculator devices 1010-1012. Further, the communication device 902 may be configured for transmitting a maturity status to the one or more investor devices 1006-1008. Further, the communication device 902 may be configured for receiving DTR purchase request data from the one or more investor devices 1006-1008 associated with the one or more investors. Further, the DTR purchase request data may include one or more DTR identifiers associated with the one or more DTR Arbitrage CDs and one or more investor data associated with the one or more investors. Further, the processing device 904 may be configured for identifying the one or more CDs based on the one or more CD identifiers. Further, at least one bank may offer the one or more CDs. Further, the one or more CDs may be associated with a term and a coupon. Further, the processing device 904 may be configured for processing a transaction of the one or more CDs using the one or more speculator data based on the identifying. Further, the processing device 904 may be configured for generating one or more Depository Trading Receipts (DTR) Arbitrage CD for the one or more CDs based on the arbitrage creating request. Further, the processing device 904 may be configured for identifying the one or more DTR Arbitrage CDs based on the one or more DTR identifiers. Further, the processing device 904 may be configured for processing a transaction for the one or more DTR Arbitrage CDs using the one or more investor data based on the identifying. Further, the processing device 904 may be configured for analyzing the one or more DTR Arbitrage CDs. Further, the processing device 904 may be configured for determining the maturity status of the one or more DTR Arbitrage CDs.

In some embodiments, the processing device 904 may be configured for creating a second smart contract with one or more information associated with the one or more CDs based on the generating of the one or more DTR Arbitrage CDs. Further, the second smart contract may credit one or more principal payments and one or more interest payments into one or more accounts of the one or more investors based on the determining.

In some embodiments, the second smart contract may be appended with one or more new information based on the transaction for the one or more DTR Arbitrage CDs. Further, the second smart contract and the transaction for the one or more DTR Arbitrage CDs may be embedded onto the distributed ledger based on the processing.

Further, in some embodiments, the communication device 902 may be configured for receiving one or more CD identifiers associated with one or more CDs from the one or more investor devices 1006-1008. Further, the one or more CDs may be associated with a value. Further, the one or more investors may be in need of the value to satisfy a short-term margin call. Further, the communication device 902 may be configured for transmitting a maturity status associated with one or more DTR CDs to the one or more investor devices 1006-1008. Further, the processing device 904 may be configured for identifying the one or more CDs based on the one or more CD identifiers. Further, the processing device 904 may be configured for generating one or more Depository Trading Receipts (DTR) CD for the one or more CDs based on the identifying. Further, the processing device 904 may be configured for analyzing the one or more DTR CDs. Further, the processing device 904 may be configured for determining the maturity status of the one or more DTR CDs.

In some embodiments, the processing device 904 may be configured for creating a third smart contract with one or more information associated with the one or more CDs based on the generating of the one or more DTR CDs. Further, the third smart contract one or more of withdraws and credits at least one payment between two or more accounts based on the determining.

Further, in some embodiments, the communication device 902 may be configured for receiving investment request data from the one or more investor devices 1006-1008. Further, the investment request data may include an investment of a value in one or more CDs in a future time and one or more investor data associated with the one or more investors. Further, the communication device 902 may be configured for transmitting a depository trading receipt (DTR) of a fourth smart contract for an exchange and the premium data to two or more issuer devices (such as the one or more issuer devices 1002-1004) associated with two or more issuers. Further, the communication device 902 may be configured for receiving one or more acknowledgments for the exchange from the one or more issuer devices 1002-1004. Further, the one or more premiums may be credited to one or more issuer accounts associated with the one or more issuers using the fourth smart contract based on the one or more acknowledgments. Further, the processing device 904 may be configured for creating the fourth smart contract based on the investment request data. Further, the fourth smart contract may include one or more information associated with the investment. Further, the DTR of the fourth smart contract may be issued based on the creating. Further, the processing device 904 may be configured for analyzing the fourth smart contract. Further, the processing device 904 may be configured for generating a premium data associated with one or more premiums to be paid to the one or more issuers based on the analyzing. Further, the processing device 904 may be configured for comparing a current date associated with the DTR of the fourth smart contract with an excise date associated with the DTR of the fourth smart contract. Further, the processing device 904 may be configured for determining a maturity status of the DTR of the fourth smart contract based on the comparing. Further, at least one principal amount may be credited into the one or more issuer accounts using the fourth smart contract based on the determining. Further, the one or more investor purchases the one or more CDs on the excise date.

Further, in some embodiments, the communication device 902 may be configured for receiving a second investment request data from the one or more investor devices 1006-1008 associated with one or more investors. Further, the second investment request data may include an investment of a value in the one or more certificates of deposit in a future time. Further, the investment of the value in the one or more CDs may be associated with a term. Further, the communication device 902 may be configured for transmitting a DTR of a fifth smart contract for an exchange and the premium data to two or more issuer devices (such as the one or more issuer devices 1002-1004) associated with two or more issuers. Further, the communication device 902 may be configured for receiving one or more acknowledgments for the exchange from the one or more issuer devices 1002-1004. Further, the one or more premiums may be credited to one or more issuer accounts associated with the one or more issuers using the fifth smart contract based on the one or more acknowledgments. Further, the communication device 902 may be configured for receiving a sell request for selling the fifth smart contract from the one or more investor devices 1006-1008. Further, the communication device 902 may be configured for transmitting the sell request to two or more buyer devices 1014-1016 (as shown in FIG. 10) associated with two or more buyers. Further, the communication device 902 may be configured for receiving buy data from one or more buyer devices (such as the two or more buyer devices 1014-1016) associated with one or more buyers. Further, the buy data may include an acknowledgment for buying the fifth smart contract and one or more buyer data associated with the one or more buyers. Further, the processing device 904 may be configured for creating the fifth smart contract based on the second investment request data. Further, the fifth smart contract may include one or more information associated with the investment. Further, a DTR of the fifth smart contract may be issued based on the creating. Further, the processing device 904 may be configured for analyzing the fifth smart contract. Further, the processing device 904 may be configured for generating a premium data associated with one or more premiums to be paid to one or more issuers based on the analyzing of the fifth smart contract. Further, the processing device 904 may be configured for processing a transaction of the fifth smart contract between the one or more investors and the one or more buyers using the one or more investor data and the one or more buyer data.

Further, in some embodiments, the communication device 902 may be configured for receiving a third purchase request data from the one or more speculator devices 1010-1012 associated with one or more speculators. Further, the third purchase request data may include one or more CD identifiers associated with one or more CDs and one or more speculator data associated with the one or more speculators. Further, the communication device 902 may be configured for receiving one or more coupon creating data from the one or more speculator devices 1010-1012. Further, the one or more coupon creating data may include a coupon creating request and one or more coupon data for creating a number of coupons. Further, the processing device 904 may be configured for identifying the one or more CDs based on the one or more CD identifiers. Further, at least one bank may offer the one or more CDs. Further, the processing device 904 may be configured for processing a transaction of the one or more CDs using the one or more speculator data based on the identifying. Further, the processing device 904 may be configured for removing one or more coupons associated with the one or more CDs based on the coupon creating request. Further, the processing device 904 may be configured for generating the number of coupons from the one or more CDs based on the removing and the one or more coupon data.

In some embodiments, the processing device 904 may be configured for creating a sixth smart contract for each coupon of the number of coupons. Further, the sixth smart contract of each coupon of the number of coupons may be traded.

FIG. 10 is a block diagram of the system 900 for facilitating arbitrage of certificate of deposits (CDs), in accordance with some embodiments.

Figure 11:
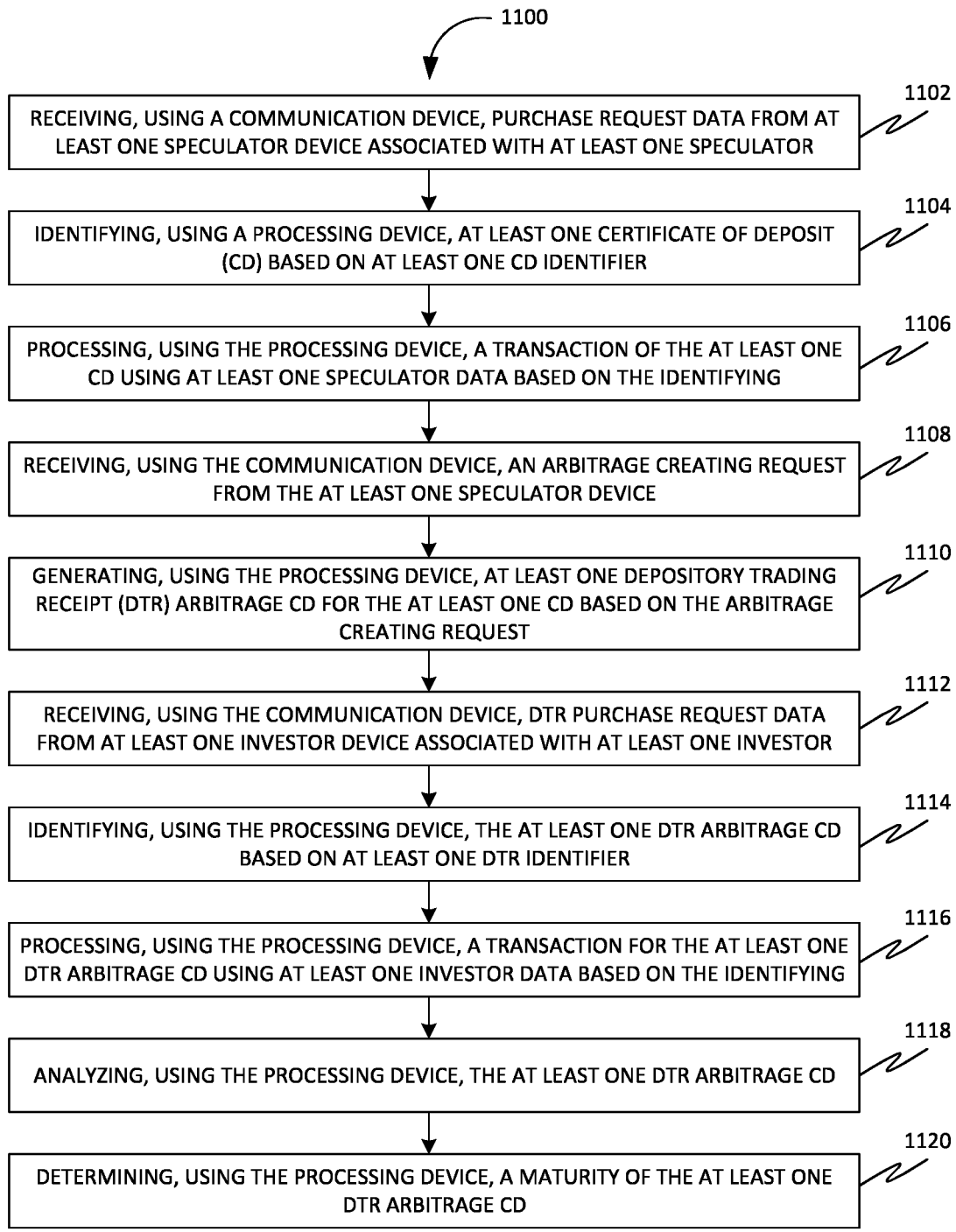
FIG. 11 is a flowchart of a method for facilitating arbitrage of certificate of deposits (CDs), in accordance with some embodiments.

FIG. 11 is a flowchart of a method 1100 for facilitating arbitrage of certificate of deposits (CDs), in accordance with some embodiments. Accordingly, at 1102, the method 1100 may include a step of receiving, using a communication device, purchase request data from at least one speculator device associated with at least one speculator. Further, the purchase request data may include at least one certificate of deposit (CD) identifier associated with at least one CD and at least one speculator data associated with the at least one speculator.

Further, at 1104, the method 1100 may include a step of identifying, using a processing device, the at least one CD based on the at least one CD identifier. Further, at least one bank offers the at least one CD. Further, the at least one CD may be associated with a term and a coupon. Further, the term may be 5 years and the coupon may be 3%.

Further, at 1106, the method 1100 may include a step of processing, using the processing device, a transaction of the at least one CD using the at least one speculator data based on the identifying.

Further, at 1108, the method 1100 may include a step of receiving, using the communication device, an arbitrage creating request from the at least one speculator device.

Further, at 1110, the method 1100 may include a step of generating, using the processing device, at least one Depository Trading Receipt (DTR) Arbitrage CD for the at least one CD based on the arbitrage creating request. Further, the at least one DTR Arbitrage CD may be associated with a first term and a first coupon. Further, the first term may be 5 years and the first coupon may be 2.5%. Further, a smart contract with at least one information associated with the at least one CD may be created based on the generating of the at least one DTR Arbitrage CD.

Further, at 1112, the method 1100 may include a step of receiving, using the communication device, DTR purchase request data from at least one investor device associated with at least one investor. Further, the DTR purchase request data may include at least one DTR identifier associated with the at least one DTR Arbitrage CD and at least one investor data associated with the at least one investor.

Further, at 1114, the method 1100 may include a step of identifying, using the processing device, the at least one DTR Arbitrage CD based on the at least one DTR identifier.

Further, at 1116, the method 1100 may include a step of processing, using the processing device, a transaction for the at least one DTR Arbitrage CD using the at least one investor data based on the identifying. Further, the smart contract may be appended with at least one new information based on the transaction. Further, the smart contract and the transaction may be embedded onto a distributed ledger based on the processing.

Further, at 1118, the method 1100 may include a step of analyzing, using the processing device, the at least one DTR Arbitrage CD.

Further, at 1120, the method 1100 may include a step of determining, using the processing device, a maturity of the at least one DTR Arbitrage CD. Further, the smart contract credits at least one principal payment and at least one interest payment into at least one account of the at least one investor based on the determining.

Figure 12:
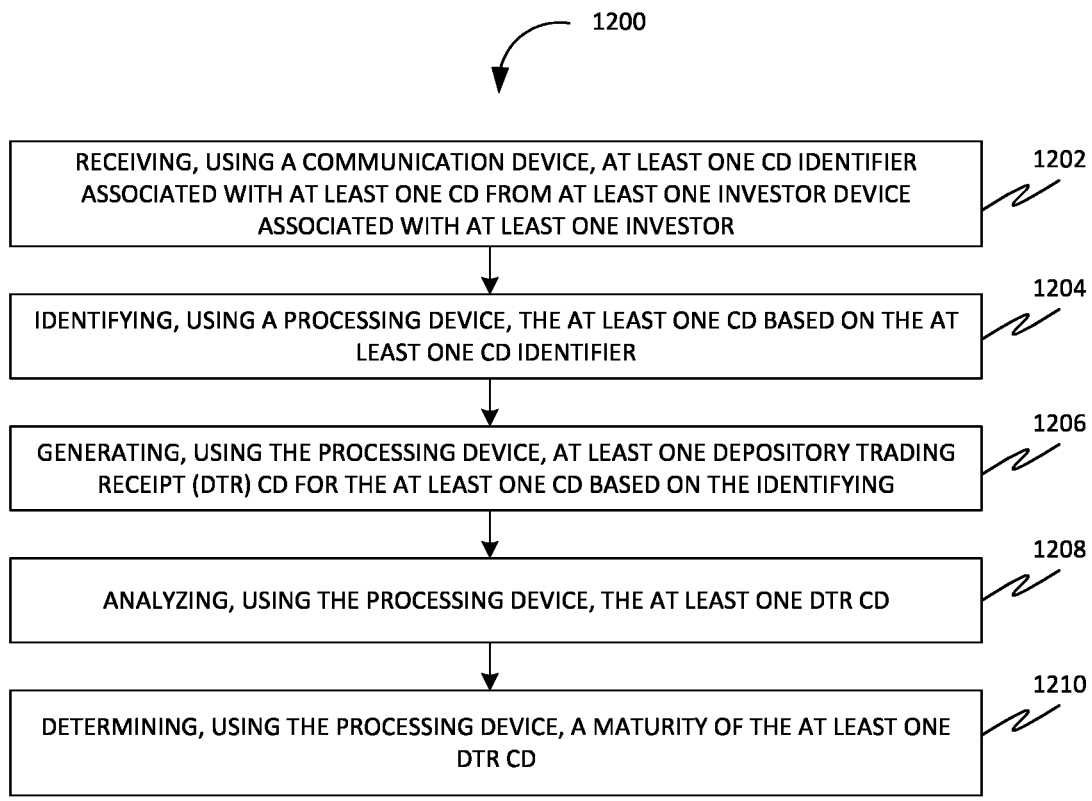
FIG. 12 is a flowchart of a method for facilitating monetizing of certificate of deposits (CDs), in accordance with some embodiments.

FIG. 12 is a flowchart of a method 1200 for facilitating monetizing of certificate of deposits (CDs), in accordance with some embodiments. Accordingly, at 1202, the method 1200 may include a step of receiving, using a communication device, at least one CD identifier associated with at least one CD from at least one investor device associated with at least one investor. Further, the at least one CD may be associated with a value. Further, the at least one investor may be in need of the value to satisfy a short-term margin call.

Further, at 1204, the method 1200 may include a step of identifying, using a processing device, the at least one CD based on the at least one CD identifier.

Further, at 1206, the method 1200 may include a step of generating, using the processing device, at least one Depository Trading Receipt (DTR) CD for the at least one CD based on the identifying. Further, a smart contract with at least one information associated with the at least one CD may be created based on the generating of the at least one DTR CD.

Further, at 1208, the method 1200 may include a step of analyzing, using the processing device, the at least one DTR CD.

Further, at 1210, the method 1200 may include a step of determining, using the processing device, a maturity of the at least one DTR CD. Further, the smart contract at least one of withdraws and credits at least one payment between a plurality of accounts based on the determining.

Figure 13:
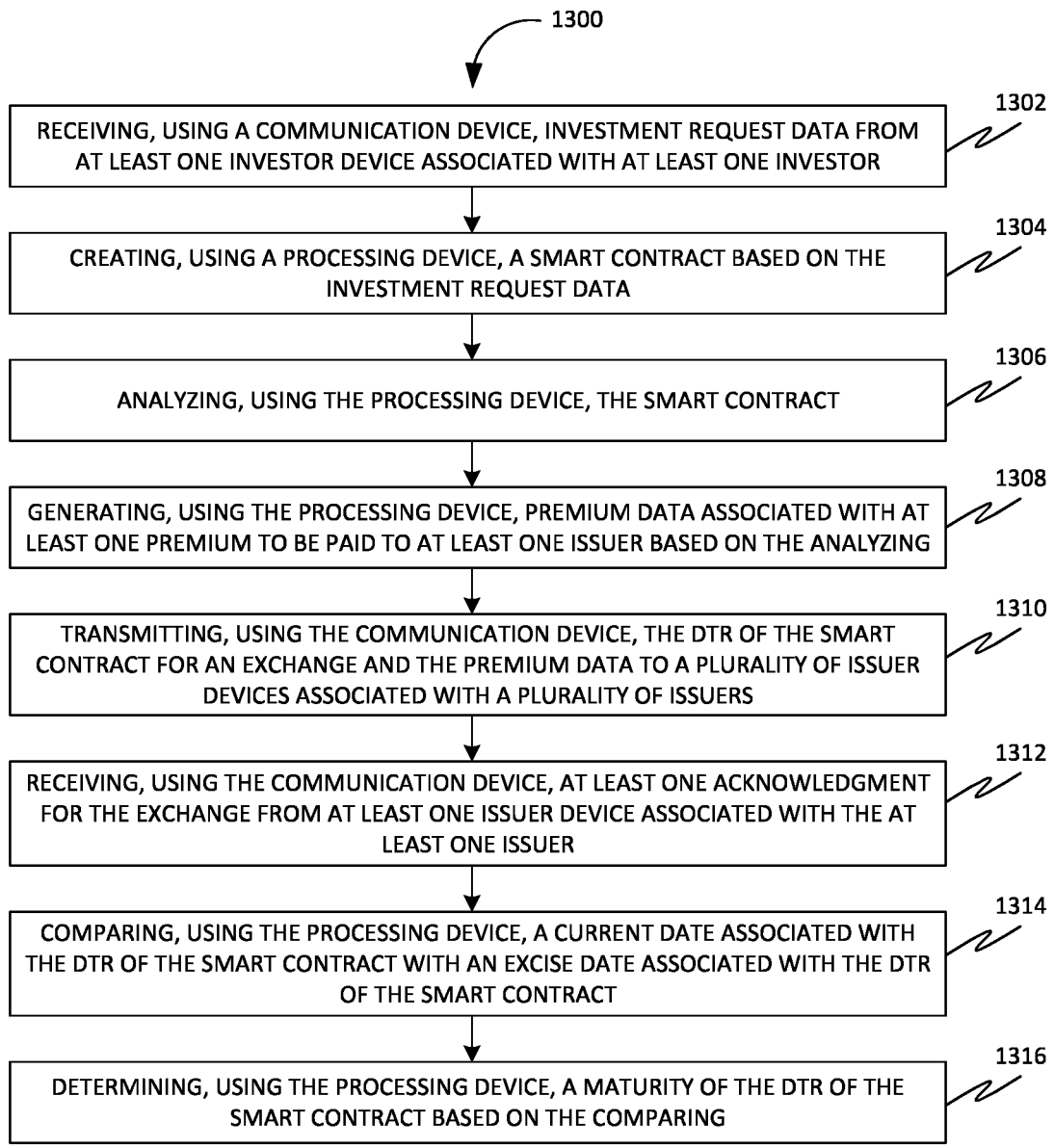
FIG. 13 is a flowchart of a method for facilitating forward trading of certificate of deposits (CDs), in accordance with some embodiments.

FIG. 13 is a flowchart of a method 1300 for facilitating forward trading of certificate of deposits (CDs), in accordance with some embodiments. Accordingly, at 1302, the method 1300 may include a step of receiving, using a communication device, investment request data from at least one investor device associated with at least one investor. Further, the investment request data may include an investment of a value in at least one CD in a future time and at least one investor data associated with the at least one investor. Further, the investment of the value in the at least one CD may be associated with a term.

Further, at 1304, the method 1300 may include a step of creating, using a processing device, a smart contract based on the investment request data. Further, the smart contract may include at least one information associated with the investment. Further, a depository trading receipt DTR of the smart contract may be issued based on the creating.

Further, at 1306, the method 1300 may include a step of analyzing, using the processing device, the smart contract.

Further, at 1308, the method 1300 may include a step of generating, using the processing device, premium data associated with at least one premium to be paid to at least one issuer based on the analyzing.

Further, at 1310, the method 1300 may include a step of transmitting, using the communication device, the DTR of the smart contract for an exchange and the premium data to a plurality of issuer devices associated with a plurality of issuers.

Further, at 1312, the method 1300 may include a step of receiving, using the communication device, at least one acknowledgment for the exchange from at least one issuer device associated with the at least one issuer. Further, the at least one premium may be credited to at least one issuer account associated with the at least one issuer using the smart contract based on the at least one acknowledgment.

Further, at 1314, the method 1300 may include a step of comparing, using the processing device, a current date associated with the DTR of the smart contract with an excise date associated with the DTR of the smart contract.

Further, at 1316, the method 1300 may include a step of determining, using the processing device, a maturity of the DTR of the smart contract based on the comparing. Further, at least one principal amount may be credited into the at least one issuer account using the smart contract based on the determining. Further, the at least one investor purchases the at least one CD on the excise date.

Figure 14:
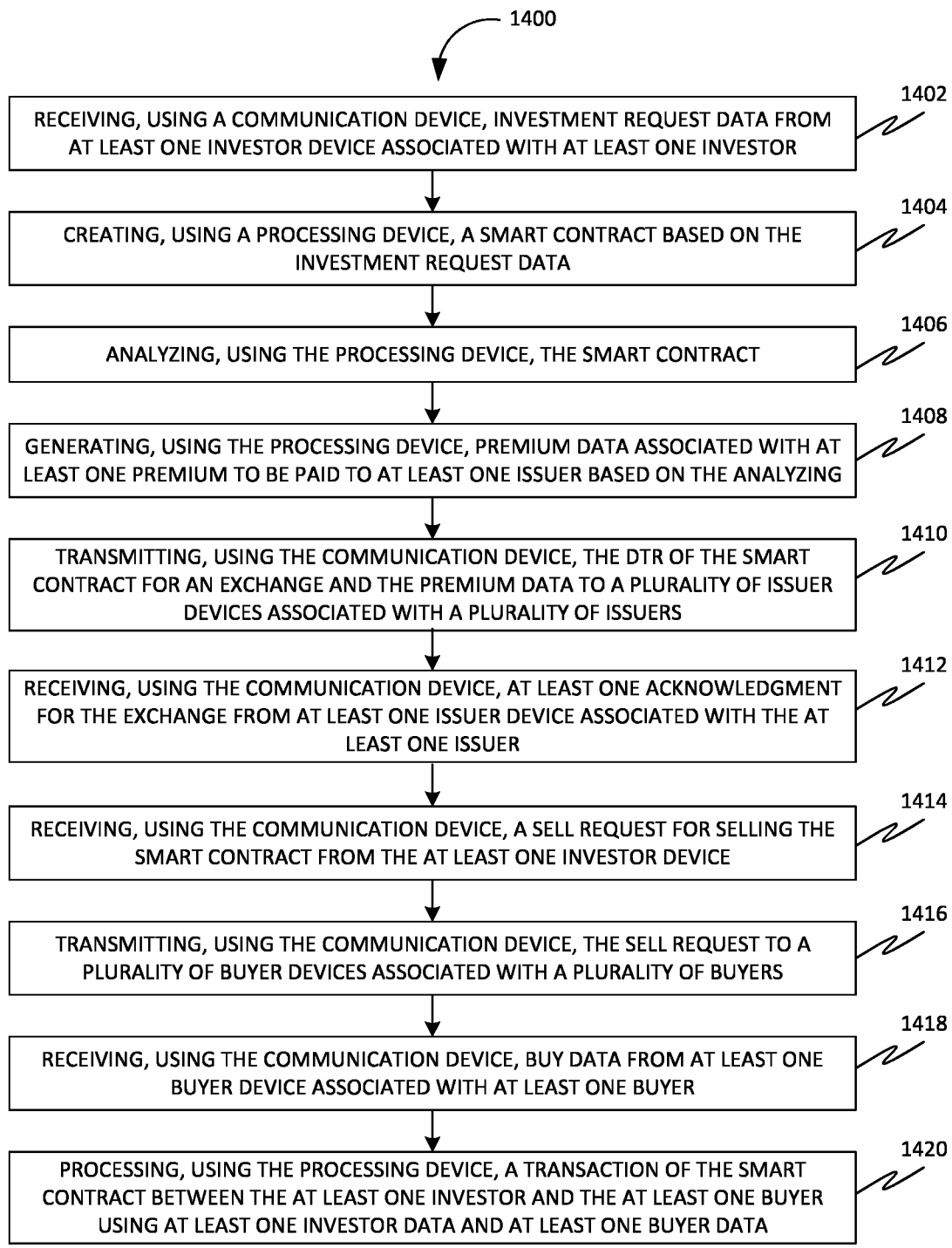
FIG. 14 is a flowchart of a method for facilitating option trading of a smart contract, in accordance with some embodiments.

FIG. 14 is a flowchart of a method 1400 for facilitating option trading of a smart contract, in accordance with some embodiments. Accordingly, at 1402, the method 1400 may include a step of receiving, using a communication device, investment request data from at least one investor device associated with at least one investor. Further, the investment request data may include an investment of a value in at least one certificate of deposit (CD) in a future time and at least one investor data associated with the at least one investor. Further, the investment of the value in the at least one CD may be associated with a term.

Further, at 1404, the method 1400 may include a step of creating, using a processing device, a smart contract based on the investment request data. Further, the smart contract may include at least one information associated with the investment. Further, a DTR of the smart contract may be issued based on the creating.

Further, at 1406, the method 1400 may include a step of analyzing, using the processing device, the smart contract.

Further, at 1408, the method 1400 may include a step of generating, using the processing device, premium data associated with at least one premium to be paid to at least one issuer based on the analyzing.

Further, at 1410, the method 1400 may include a step of transmitting, using the communication device, the DTR of the smart contract for an exchange and the premium data to a plurality of issuer devices associated with a plurality of issuers.

Further, at 1412, the method 1400 may include a step of receiving, using the communication device, at least one acknowledgment for the exchange from at least one issuer device associated with the at least one issuer. Further, the at least one premium may be credited to at least one issuer account associated with the at least one issuer using the smart contract based on the at least one acknowledgment.

Further, at 1414, the method 1400 may include a step of receiving, using the communication device, a sell request for selling the smart contract from the at least one investor device.

Further, at 1416, the method 1400 may include a step of transmitting, using the communication device, the sell request to a plurality of buyer devices associated with a plurality of buyers.

Further, at 1418, the method 1400 may include a step of receiving, using the communication device, buy data from at least one buyer device associated with at least one buyer. Further, the buy data may include an acknowledgment for buying the smart contract and at least one buyer data associated with the buyer.

Further, at 1420, the method 1400 may include a step of processing, using the processing device, a transaction of the smart contract between the at least one investor and the at least one buyer using the at least one investor data and the at least one buyer data.

Figure 15:
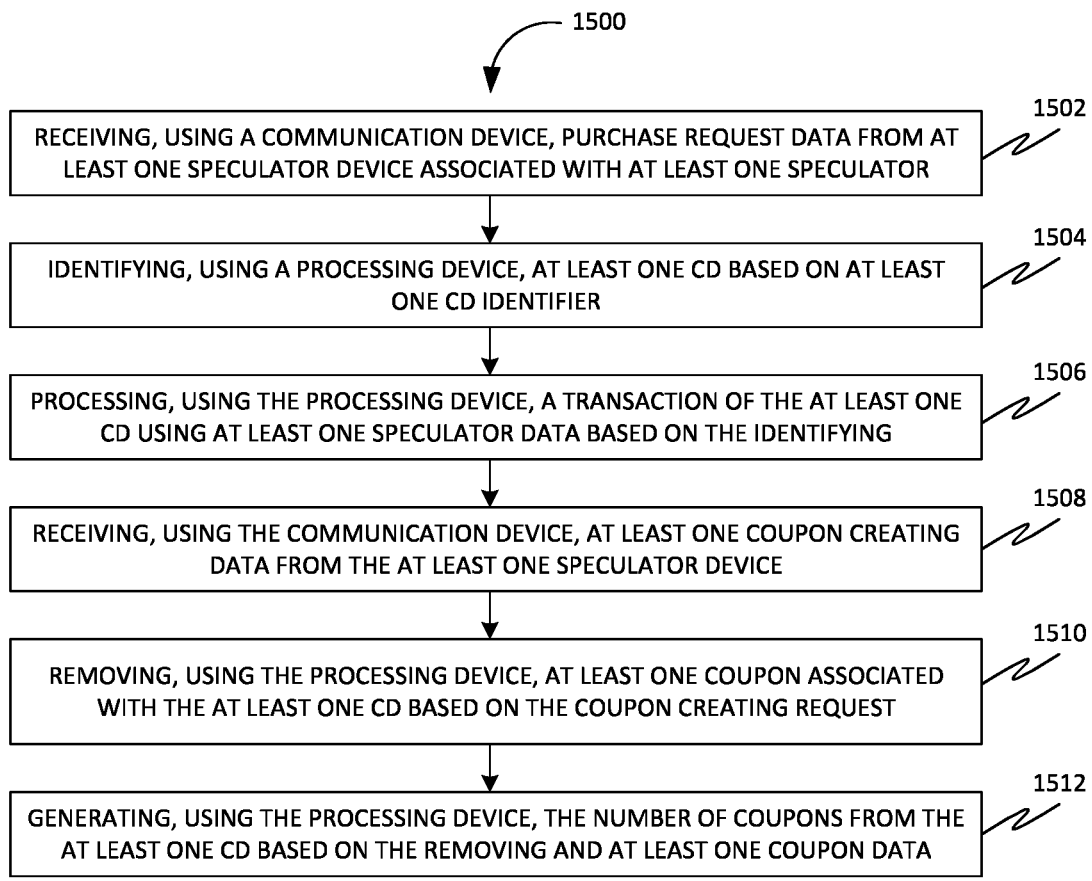
FIG. 15 is a flowchart of a method for facilitating trading of holding interest and principal shares of a certificate of deposit (CD), in accordance with some embodiments.

FIG. 15 is a flowchart of a method 1500 for facilitating trading of holding interest and principal shares of a certificate of deposit (CD), in accordance with some embodiments. Accordingly, at 1502, the method 1500 may include a step of receiving, using a communication device, purchase request data from at least one speculator device associated with at least one speculator. Further, the purchase request data may include at least one CD identifier associated with at least one CD and at least one speculator data associated with the at least one speculator.

Further, at 1504, the method 1500 may include a step of identifying, using a processing device, the at least one CD based on the at least one CD identifier. Further, at least one bank offers the at least one CD. Further, the at least one CD may be associated with a term and a coupon. Further, the term may be 5 years and the coupon may be 3%.

Further, at 1506, the method 1500 may include a step of processing, using the processing device, a transaction of the at least one CD using the at least one speculator data based on the identifying.

Further, at 1508, the method 1500 may include a step of receiving, using the communication device, at least one coupon creating data from the at least one speculator device. Further, the at least one coupon creating data may include a coupon creating request and at least one coupon data for creating a number of coupons.

Further, at 1510, the method 1500 may include a step of removing, using the processing device, at least one coupon associated with the at least one CD based on the coupon creating request.

Further, at 1512, the method 1500 may include a step of generating, using the processing device, the number of coupons from the at least one CD based on the removing and the at least one coupon data. Further, a smart contract may be created for each coupon of the number of coupons. Further, the smart contract of each coupon of the number of coupons may be traded.

Figure 16:
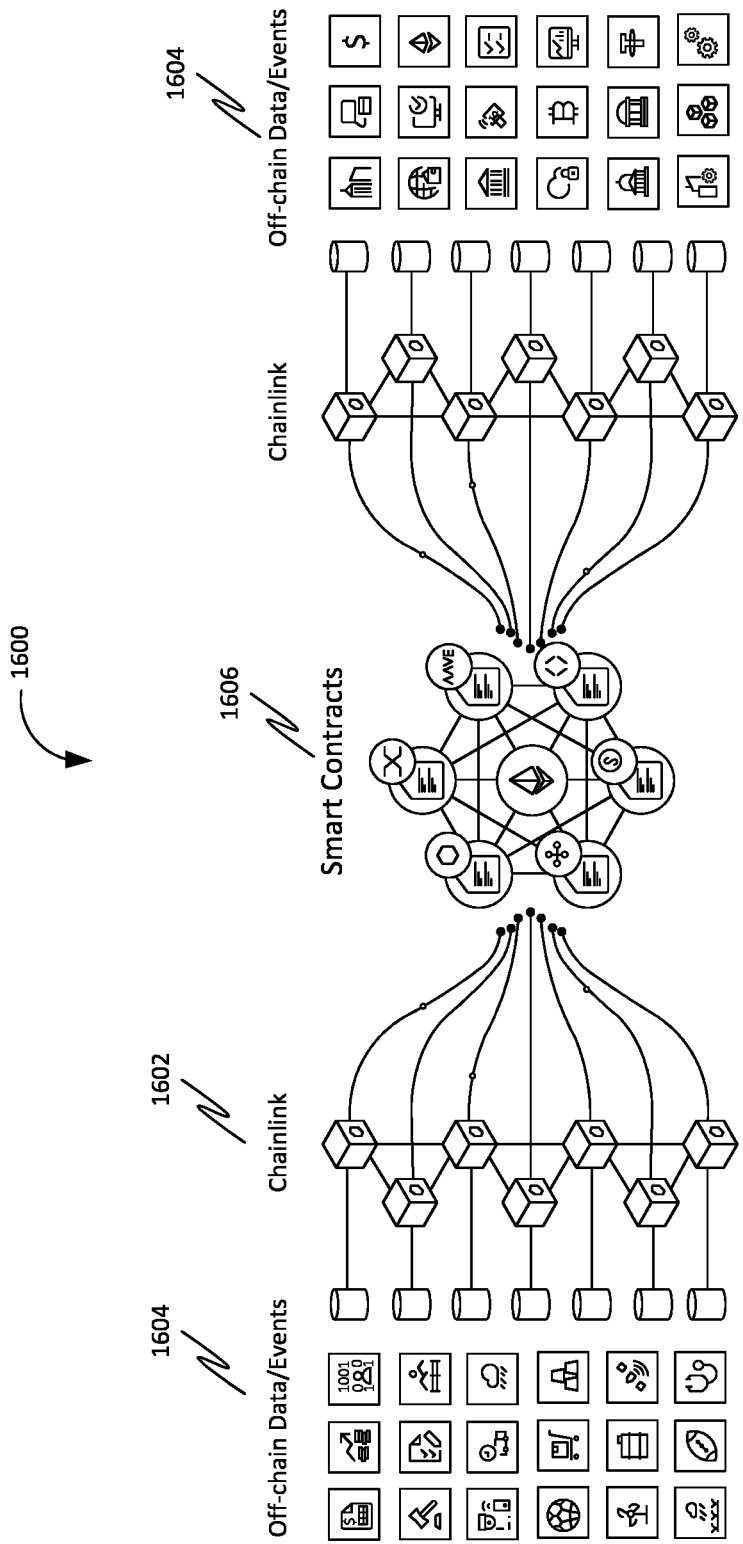
FIG. 16 is a schematic of a chainlink of a CDXchange for facilitating trading of non-negotiable assets, in accordance with some embodiments.

FIG. 16 is a schematic of a chainlink 1602 of a CDXchange 1600 for facilitating trading of non-negotiable assets, in accordance with some embodiments. Further, the CDXchange 1600 utilizes Chainlink 1602 for the oracle smart contracts. Further, the CDXchange 1600 may be associated with smart contracts 1606. Further, the Chainlink 1602 makes off-chain, real-world data 1604 usable on the Algorand smart contract. Further, the Chainlink 1602 connects the smart contracts 1606 with external data using its decentralized oracle network. Further, Chainlink API requests may be handled 1:1 by an oracle. Further, with on-chain aggregation, data may be aggregated from a decentralized network of independent oracle nodes. Further, the Chainlink 1602 ability to connect with any API and perform any off-chain computation may open up a wide variety of derivative products that may be built on CDXchange 1600.

Figure 17:
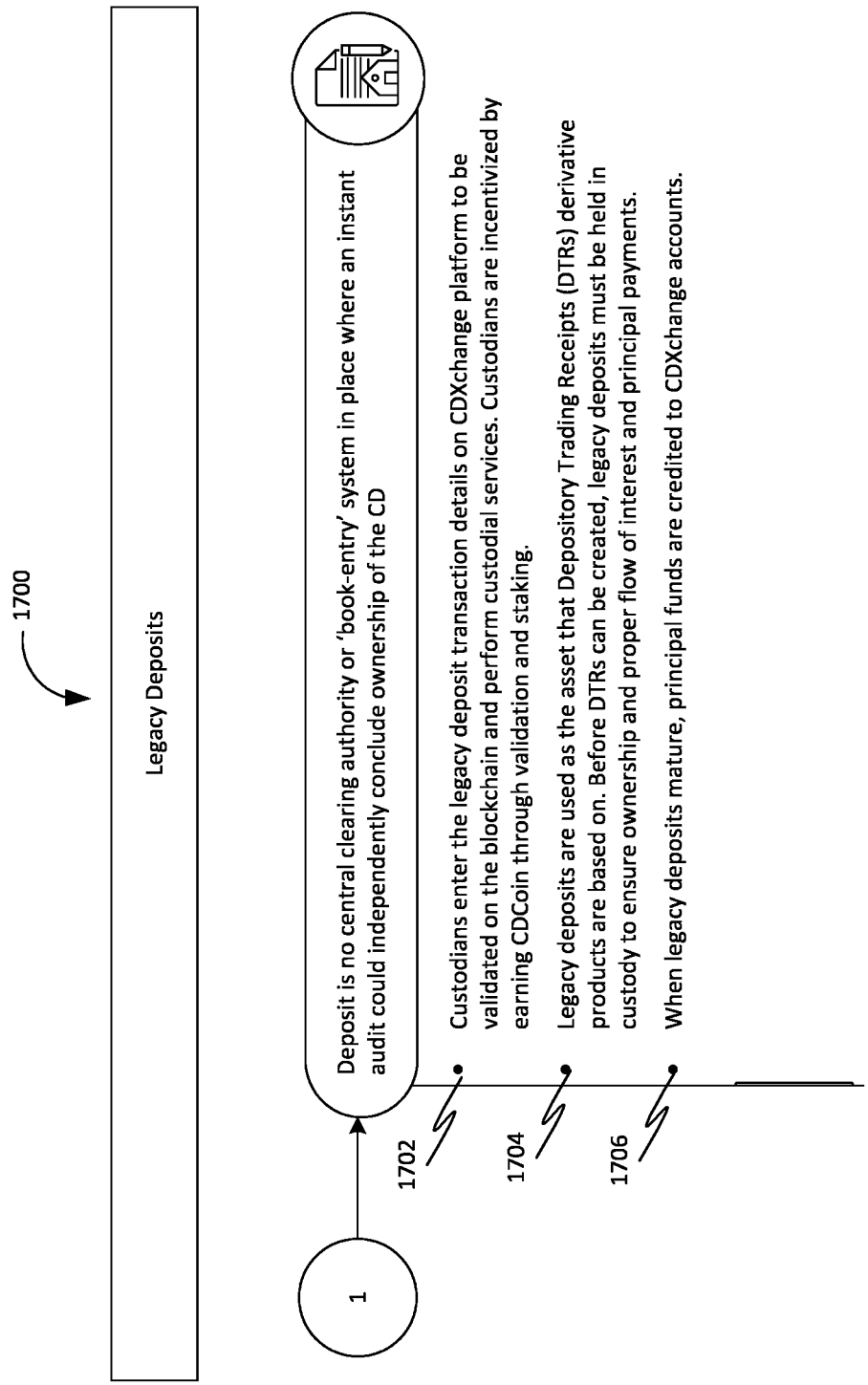
FIG. 17 is a flow diagram of a method for facilitating trading of Legacy Deposits (LDs) on the CDXchange, in accordance with some embodiments.

FIG. 17 is a flow diagram of a method 1700 for facilitating trading of Legacy Deposits (LDs) on the CDXchange, in accordance with some embodiments. Further, LDs may originate off-chain and within normal distribution channels such as branches, and online. Further, Legacy Deposits are non-transferable and are not registered with any clearing exchange. Further, custodial registration and block creation may monetize LDs by creating derivative products. Further, cashflows and principal fractionalization are 'sold off' in synthetic financial products collateralized by 100% FDIC/NCUA insured CDs. Further, the deposits issued off the CDXchange platform through distribution channels like bank branches, internet banks, brokers, dealers, etc. are called LDs. Further, a central clearing authority may not be present for an instant audit of the CD. Further, at 1702, the method 1700 may include custodians entering the legacy deposit transaction details on the CDXchange platform to be validated on the blockchain and perform custodial services. Further, the custodians may incentivize earning CDCoin through validation and staking. Further, the LDs may be used as the asset-based on Depository Trading Receipts (DTRs) derivative products. Further, at 1704, before DTRs can be created, the method 1700 may include holding the legacy deposits in custody to ensure ownership and proper flow of interest and principal payments. Further, at 1706, when legacy deposits mature, the method 1700 may include crediting principal funds to CDXchange accounts.

Figure 18:
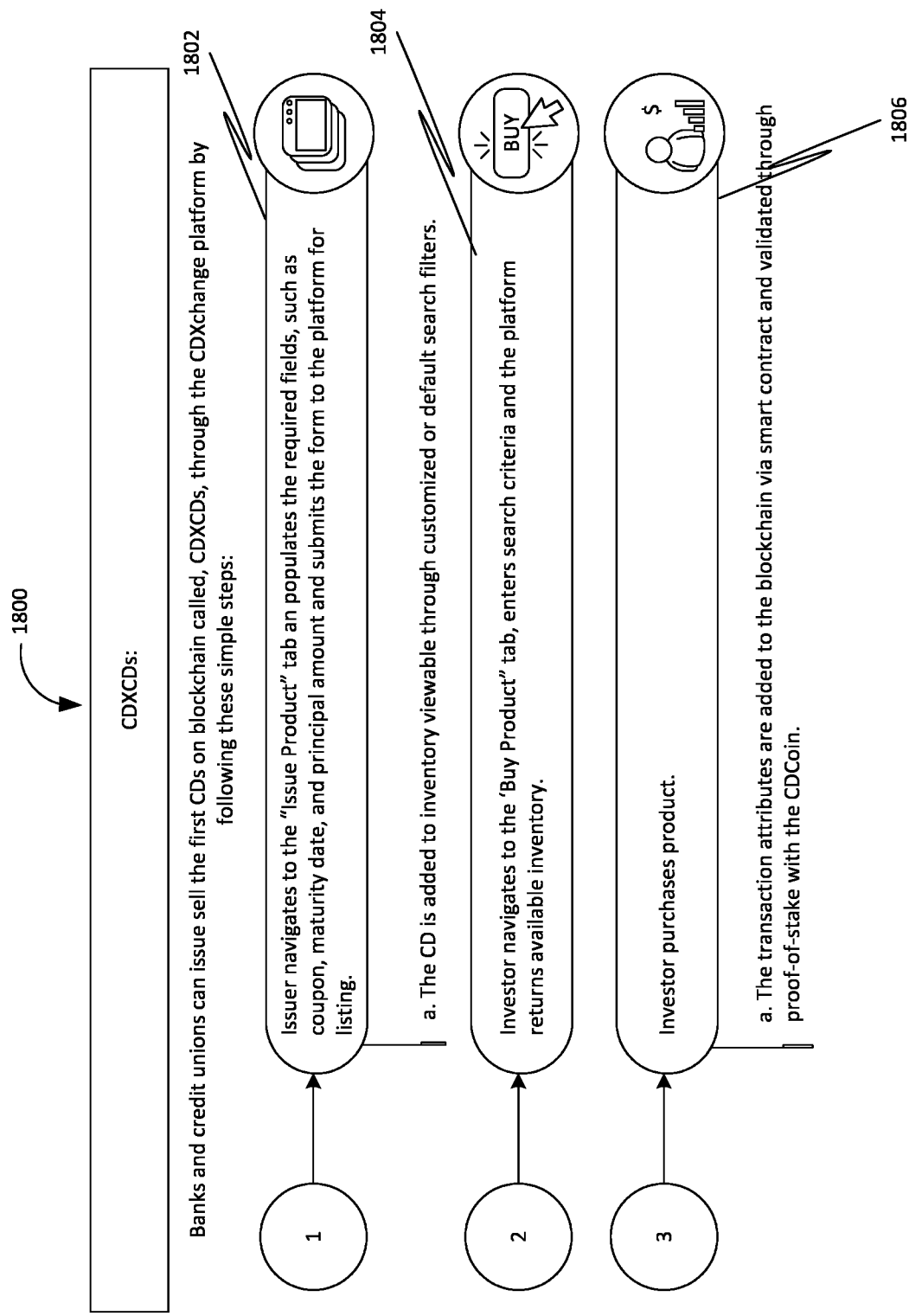
FIG. 18 is a flow diagram of a method for facilitating trading of certificate of deposits (CDXCDs) on the CDXchange, in accordance with some embodiments.

FIG. 18 is a flow diagram of a method 1800 for facilitating trading of certificate of deposits (CDXCDs) on the CDXchange, in accordance with some embodiments. Further, the CDXCDs product combines the best features of Direct Deposits CDs like syndication, transferability, quick settlement, etc. Further, the CDXCDs product combines the best features of Depository Trust Company CDs like higher coupons, interest payment flexibility, etc. Further, the CDXCDs may be issued directly from the CDXchange platform, and the Algorand Smart Contracts handle all interest payments, CD attributes, maturities, and transfers. Further, banks and credit unions may issue and sell the first-ever CDs on blockchain called, CDXCDs, through the CDXchange platform by following certain steps. Further, at 1802, the method 1800 may include a step of issuer navigating to the "Issue Product" tab and populating the required fields, such as a coupon, maturity date, and principal amount, and submitting the form to the platform for listing. Further, the CD may be added to inventory viewable through customized or default search filters. Further, at 1804, the method 1800 may include a step of an investor navigating to the "Buy Product" tab, entering search criteria, and the platform returns available memory. Further, at 1806, the method 1800 may include a step of the investor purchasing the product. Further, transaction attributes associated with the purchasing are added to a blockchain through smart contracts and validated through proof-of-stake with the CDCoin.

Figure 19:
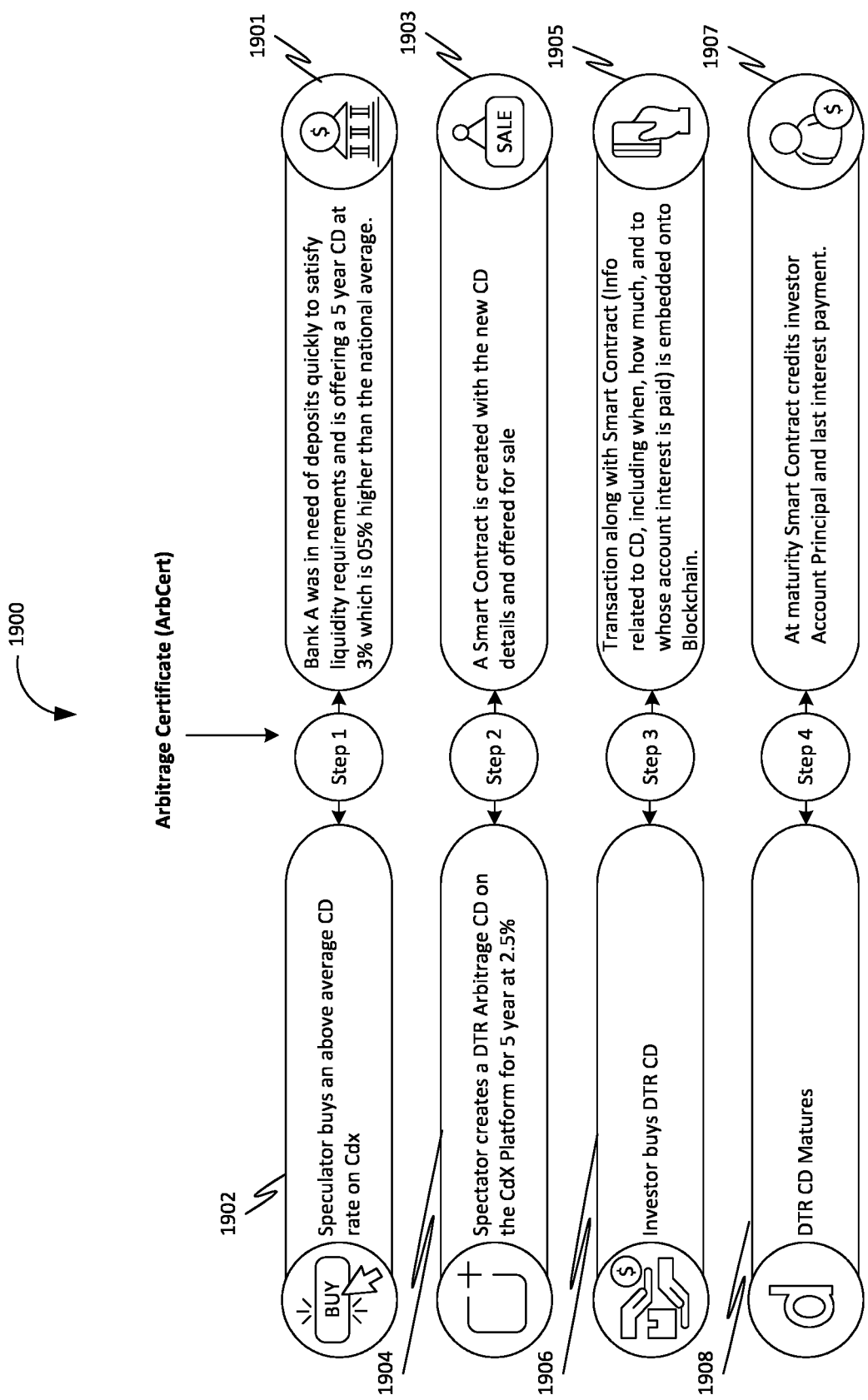
FIG. 19 is a flow diagram of a method for facilitating an Arbitrage Certificate (ArbCert) on the CDXchange, in accordance with some embodiments.

FIG. 19 is a flow diagram of a method 1900 for facilitating an Arbitrage Certificate (ArbCert) on the CDXchange, in accordance with some embodiments. Further, the arbitrage may be used whenever any asset may be purchased in one market at a given price and simultaneously sold in another market at a higher price. Further, the situation creates an opportunity for a risk-free profit for the speculator. Further, Arbitrage provides a mechanism to ensure that prices do not deviate substantially from fair value for long periods. Further, many traders have computerized trading systems set to monitor fluctuations in similar financial instruments. Any inefficient pricing setups may be acted upon quickly, and the opportunity is eliminated in a matter of seconds. Further, at 1902, the method 1900 may include a step of a speculator buying an above average CD rate on the CDXchange. Further, at 1901, in an instance, a bank may be in need of deposits quickly to satisfy requirements and may be offering a 5 year CD at 3% which is 0.5% higher than the national average. Further, at 1904, the method 1900 may include a step of the speculator creating a DTR arbitrage CD on the CDXchange platform for 5 years at 2.5%. Further, at 1903, the method 1900 may include creating a smart contract with the new CD details and offered for sale. Further, at 1906, the method 1900 may include a step of an investor buying the DTR CD. Further, at 1905, the method 1900 may include embedding the transaction along with the smart contract (info related to CD, including when, how much, and to whose account interest is paid) into a blockchain. Further, the DTR CD may attain maturity. Further, at 1908, the method 1900 may include a step of detecting maturity of DTR CD. Further, at 1907, the method 1900 may include the smart contract crediting principal and last interest payment in the investor's account at maturity.

Figure 20:
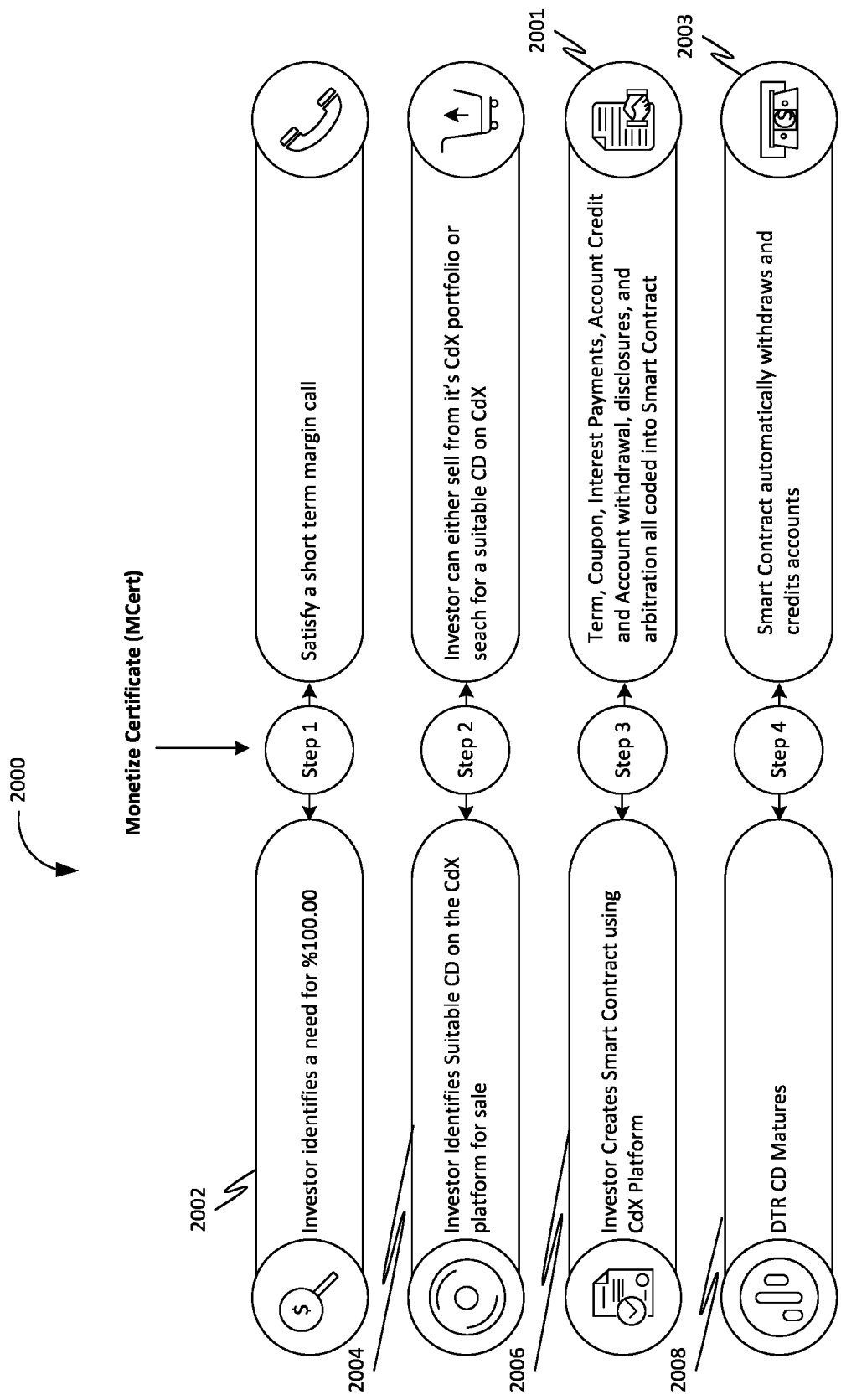
FIG. 20 is a flow diagram of a method for facilitating a Monetize Certificate (MCert) on the CDXchange, in accordance with some embodiments.

FIG. 20 is a flow diagram of a method 2000 for facilitating a Monetize Certificate (MCert) on the CDXchange, in accordance with some embodiments. Further, there are instances where issuers may just want to monetize one CD position or their entire portfolio by reselling all cashflows for specific periods. Further, without the DTR Monetize product, the issuer would have to accept an early withdrawal penalty from the issuing bank. Further, the issuers may want to sell a CD position for many reasons. Further, the issuer may believe that higher returns could be had in other financial instruments. Further, in some cases, the issuer may need to raise cash for liquidity purposes. Further, at 2002, the method 2000 may include a step of an investor identifying a need for $100,000 to satisfy a short-term margin call. Further, at 2004, the method 2000 may include a step the investor identifying a suitable certificate of deposit CD on the CDXchange platform for sale. Further, the investor may either sell from its CdX portfolio or search for a suitable CD on the CdXchange platform. Further, at 2006, the method 2000 may include a step of the investor creating a smart contract using the CDXchange platform. Further, at 2001, the method 2000 may include coding terms, coupons, interest payments, credit, withdrawal, disclosures, arbitration, etc. into the smart contract. Further, at 2008, the method 2000 may include detecting maturity of the DTR CD. Further, upon maturing of the DTR CD, at 2003, the method 2000 may include the smart contract withdrawing and crediting to accounts.

Figure 21:
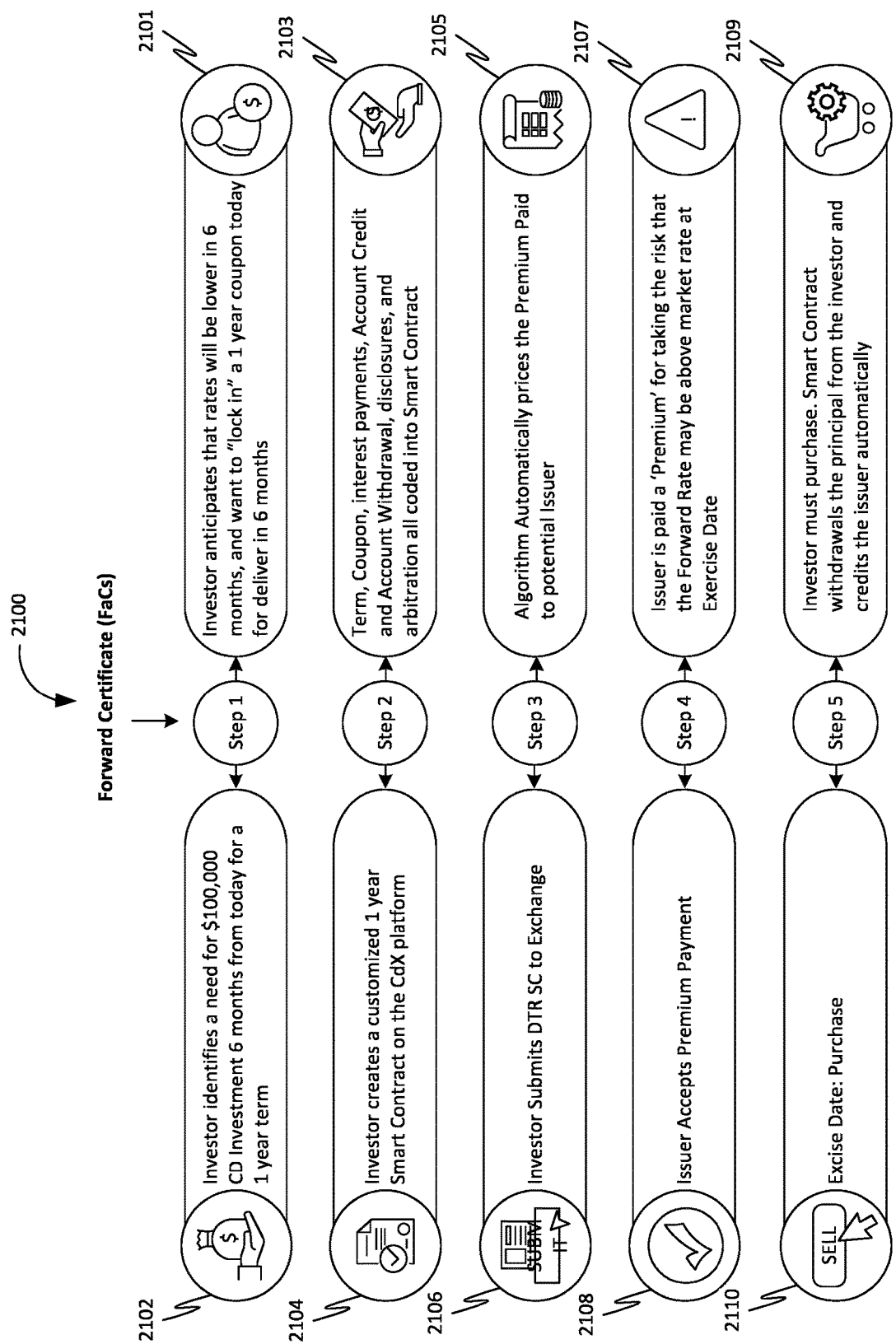
FIG. 21 is a flow diagram of a method for facilitating a Forward Certificate (FaCs) on the CDXchange, in accordance with some embodiments.

FIG. 21 is a flow diagram of a method 2100 for facilitating a Forward Certificate (FaCs) on the CDXchange, in accordance with some embodiments. Further, the Forward Certificates help investors and receivers plan for future events where funds will be required. Further, an investor will have funds available to purchase a CD in 6 months and may be worried that rates may fall. Further, the investor may buy a Forward or Future rate and lock in a rate for settlement six months from now. For this, a Forward Certificate contract may be made between at least two parties. Further, the contract may be standardized or customized. Further, the contract may carry a premium. Further, at 2102, the method 2100 may include a step of an investor identifying a need for a $100,000 CD investment, 6 months in the future for a 1-year term. Further, at 2101, the investor may anticipate that rates may be lower in 6 months and wants to "lock in" a 1 year coupon today for delivery in 6 months. Further, at 2104, the method 2100 may include a step of the investor creating a customized 1-year smart contract on the CDXchange platform. Further, at 2103, the method 2100 may include coding terms, coupons, interest payments, credit, withdrawal, disclosures, arbitration, etc. into the smart contract. Further, at 2106, the method 2100 may include a step of the investor submitting a DTR smart contract to exchange. Further, at 2105, the method 2100 may include the algorithm automatically pricing the premium paid to the potential issuer. Further, at 2108, the method 2100 may include a step of the issuer accepting premium payment. Further, at 2107, the method 2100 may include the issuer being paid the premium for taking the risk that the forward rate may be above the market rate at the excise date. Further, at 2110, the method 2100 may include a step of the investor making a purchase on the excise date. Further, at 2109, the method 2100 may include the smart contract withdrawing a principal amount from the investor and crediting the principal amount to the issuer automatically.

Figure 22:
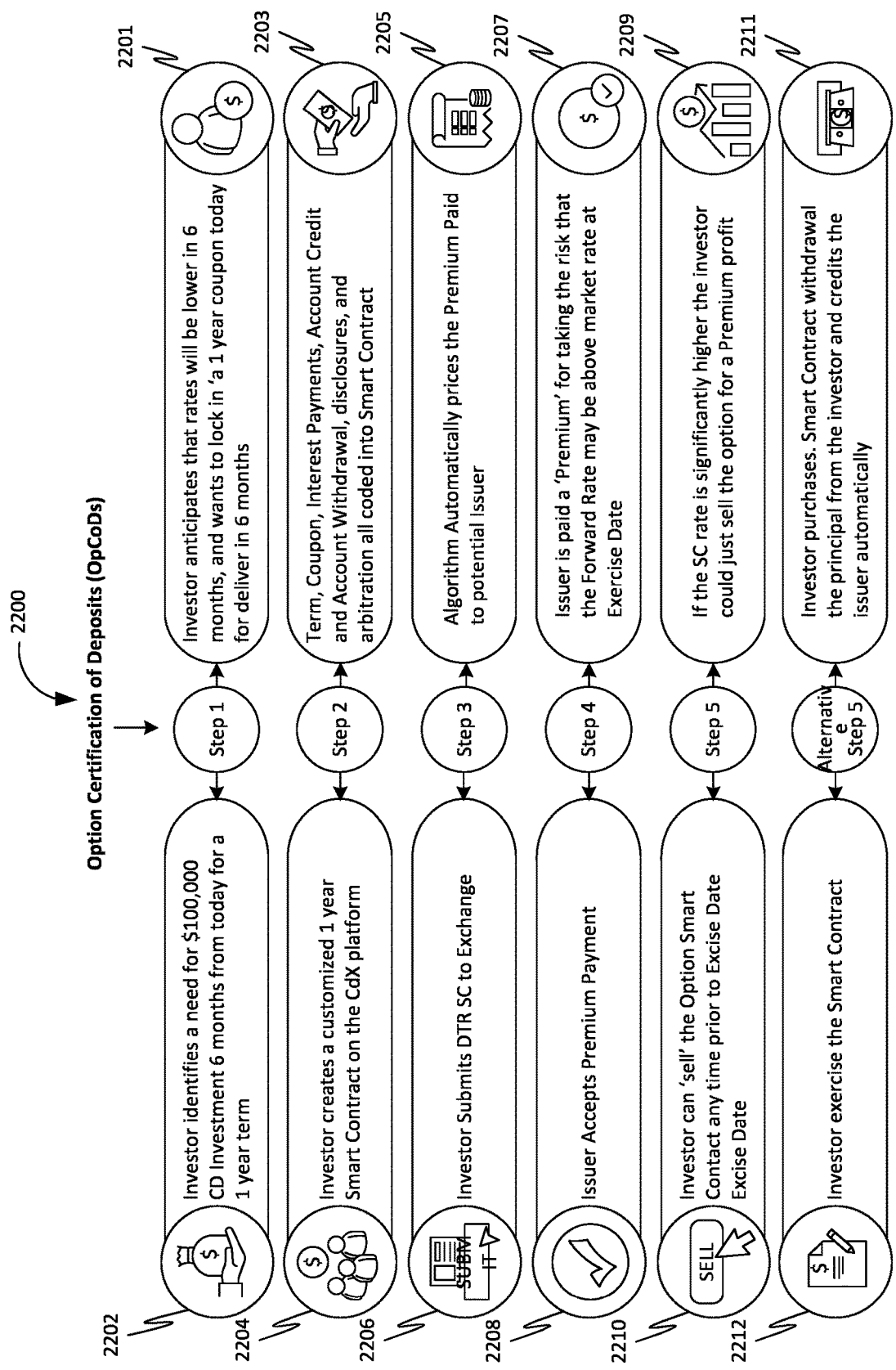
FIG. 22 is a flow diagram of a method providing Options on Certificate of Deposits (OpCoDs) on the CDXchange, in accordance with some embodiments.

FIG. 22 is a flow diagram of a method 2200 providing an Options on Certificate of Deposits (OpCoDs) on the CDXchange, in accordance with some embodiments. Further, OpCoDs allow the Investor to Opt-out (the issuer still earns a premium) regardless of the interest rate environment and enable the investor to sell the OpCoDs before the excise date. Further, OpCoDs may allow receivers to generate valuable non-interest income while allowing investors to hedge their savings and investment accounts. Further, an investor who believes that interest rates may fall in the next three months can buy the 'Option' to purchase a forward rate on a specified date with a specific term. Further, a receiver earns a fee for every OpCert created. Further, the receiver may hedge issued CDs, mortgages, savings accounts, etc. Further, the investor may buy protection against falling rates. Further, the investor speculates on the value of the contract and may sell it before the excise date. Further, at 2202, the method 2200 may include a step of an investor identifying a need for a $100,000 CD investment, 6 months in the future for a 1-year term. Further, at 2201, the method 2200 may include the investor anticipating that rates may be lower in 6 months and wants to "lock in" a 1 year coupon today for delivery in 6 months. Further, at 2204, the method 2200 may include a step of the investor creating a customized 1-year smart contract on the CDXchange platform. Further, at 2203, the method 2200 may include coding terms, coupons, interest payments, credit, withdrawal, disclosures, arbitration, etc. into the smart contract. Further, at 2206, the method 2200 may include a step of the investor submitting a DTR smart contract to exchange. Further, at 2205, the method 2200 may include the algorithm automatically pricing the premium paid to the potential issuer. Further, at 2208, the method 2200 may include a step of the issuer accepting the premium payment. Further, at 2207, the method 2200 may include the issuer being paid the premium for taking the risk that the forward rate may be above the market rate at the excise date. Further, at 2210, the method 2200 may include a step of the investor selling the option smart contract prior to the excise date. Further, if the SC rate is significantly higher, at 2209, the method 2100 may include the investor selling the option for a premium profit. Further, at 2212, the method 2200 may include an alternative step of the investor making a purchase on the excise date. Further, at 2211, the method 2200 may include the smart contract withdrawing a principal amount from the investor and crediting the principal amount to the issuer.

Figure 23:
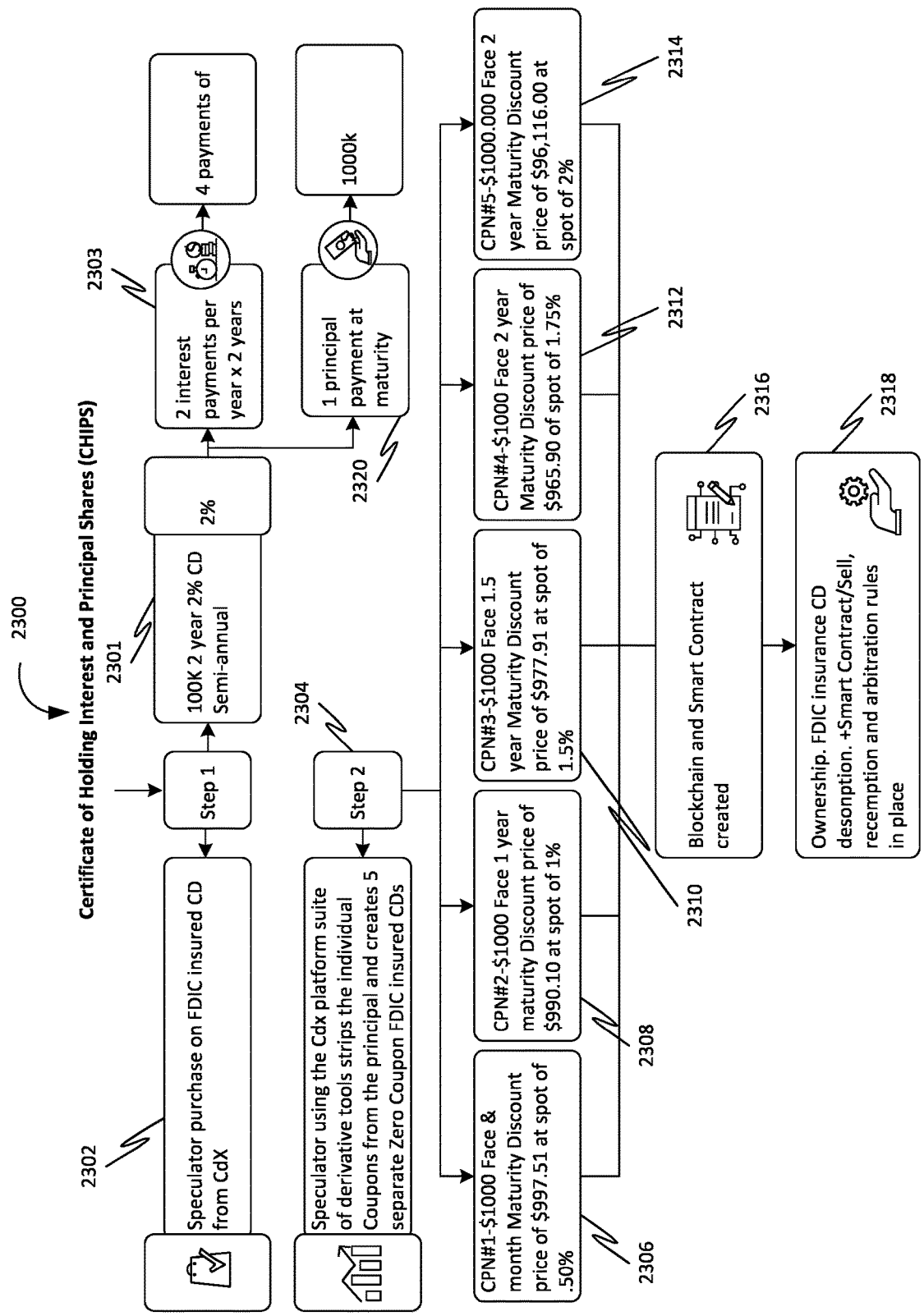
FIG. 23 is a flow diagram of a method for facilitating Certificate of Holding Interest and Principal Shares (CHIPS) on the CDXchange, in accordance with some embodiments.

FIG. 23 is a flow diagram of a method 2300 for facilitating Certificate of Holding Interest and Principal Shares (CHIPS) on the CDXchange, in accordance with some embodiments. Further, the CHIPS may be created when a CD's coupons are separated from the CD. Further, the separated CD may be sold to an investor at a discount price. Further, the difference between the discount price and the CD's face value at maturity is the investor's profit. Further, the coupons become separate investments that may be sold separately. Further, the CHIPS may be issued and insured by FDIC and NCUA institutions. Further, the CHIPS cannot be purchased directly from banks or credit unions and may only be bought on CDXchange. Further, the CHIPS are a popular choice for fixed-income investors as they have higher returns than Treasury strips and are FDIC NCUA insured. Since CHIPS are sold at a discount, investors do not require a large stash of cash to purchase them. Assuming the CHIPS are held to maturity, the investors know the actual payouts they will receive. Further, the CHIPS also offers a range of maturity dates since they are based on the dates of the interest payments. Further, if an investor wants to sell a CHIPS before its maturity, the market has enough liquidity to accommodate the transaction. Further, at 2302, the method 2300 may include a step of a speculator purchasing an FDIC-insured CD from the CDXchange. Further, at 2301, the CD may be associated with a 100K, 2 years, and a 2% semi-annual rate. Further, at 2303, the CD may be associated with 2 interest payments per year for 2 years that may be 4 payments. Further, at 2320, the CD may be associated with 1 principal payment at maturity that may be 1000K. Further, at 2304, the method 2300 may include a step of the speculator using the CDXchange platform's suite of derivative tools for stripping individual coupons from the principal and creating five separate zero-coupon FDIC insured CDs 2306-2314. Further, a first FDIC insured CD 2306 of the five separate FDIC insured CDs 2306-2314 may include a CPN #1—$1000 face 6 month maturity. Discount price of $997.51 at a spot of 50%. Further, a second FDIC insured CD 2308 of the five separate FDIC insured CDs 2306-2314 may include a CPN #2—$1000 face 1 year maturity. Discount price of $990.10 at a spot of 1%. Further, a third FDIC insured CD 2310 of the five separate FDIC insured CDs 2306-2314 may include a CPN #3—$1000 face 1.5 year maturity. Discount price of $977.91 at a spot of 1.5%. Further, a fourth FDIC insured CD 2312 of the five separate FDIC insured CDs 2306-2314 may include a CPN #4 $1000 face 1.5 year maturity. Discount price of $965.90 at a spot of 1.75%. Further, a fifth FDIC insured CD 2314 of the five separate FDIC insured CDs 2306-2314 may include a CPN #5 $100,000 face 2 year maturity. Discount price of $96,116.88. at a spot of 2%. Further, at 2316, the method 2300 may include creating a distributed ledger on a blockchain and a smart contract for the five separate FDIC insured CDs 2306-2314. Further, at 2318, the method 2300 may include putting rules associated with ownership, FDIC insurance, CD description, smart contract buy/sell, redemption, and arbitration in place.

Although the present disclosure has been explained in relation to its preferred embodiment, it is to be understood that many other possible modifications and variations can be made without departing from the spirit and scope of the disclosure.

What is claimed is:

1. A method of facilitating trading non-negotiable financial assets, the method comprising:

receiving, using a communication device, an issue data from at least one issuer device associated with at least one issuer;

issuing, using a processing device, a certificate of deposit (CD) based on the issue data, wherein the non-negotiable financial asset comprises the certificate of deposit (CD), wherein the certificate of deposit (CD) is a savings account holding a fixed amount of money for a specified time;

receiving, using the communication device, a purchase request data from at least one investor device associated with at least one investor, wherein the purchase request data comprises a CD identifier associated with the CD and at least one investor data associated with the at least one investor, wherein the at least one investor is interested in buying the CD;

identifying, using the processing device, the CD based on the CD identifier;

processing, using the processing device, a transaction for the CD using the at least one investor data;

generating, using the processing device, at least one transaction attribute associated with the transaction based on the processing;

storing, using a storage device, the at least one transaction attribute in a distributed ledger using a smart contract, wherein the at least one transaction attribute is validated through a proof-of-stake with at least one CD Coin;

transmitting, using the communication device, the CD to the at least one investor device;

receiving, using the communication device, a second purchase request data from at least one speculator device associated with at least one speculator, wherein the second purchase request data comprises at least one certificate of deposit (CD) identifier associated with at least one CD and at least one speculator data associated with the at least one speculator;

identifying, using the processing device, the at least one CD based on the at least one CD identifier, wherein at least one bank offers the at least one CD, wherein the at least one CD is associated with a term and a coupon;

processing, using the processing device, a transaction of the at least one CD using the at least one speculator data based on the identifying;

receiving, using the communication device, an arbitrage creating request from the at least one speculator device;

generating, using the processing device, at least one Depository Trading Receipt (DTR) Arbitrage CD for the at least one CD based on the arbitrage creating request;

receiving, using the communication device, DTR purchase request data from the at least one investor device associated with the at least one investor, wherein the DTR purchase request data comprises at least one DTR identifier associated with the at least one DTR Arbitrage CD and at least one investor data associated with the at least one investor;

identifying, using the processing device, the at least one DTR Arbitrage CD based on the at least one DTR identifier;

processing, using the processing device, a transaction for the at least one DTR Arbitrage CD using the at least one investor data based on the identifying;

analyzing, using the processing device, the at least one DTR Arbitrage CD;

determining, using the processing device, a maturity status of the at least one DTR Arbitrage CD;

transmitting, using the communication device, the maturity status to the at least one investor device;

the method further comprising the step of creating, using the processing device, a second smart contract with at least one information associated with the at least one CD based on the generating of the at least one DTR Arbitrage CD, wherein the second smart contract credits at least one principal payment and at least one interest payment into at least one account of the at least one investor based on the determining; and wherein the second smart contract is appended with at least one new information based on the transaction for the at least one DTR Arbitrage CD, wherein the second smart contract and the transaction for the at least one DTR Arbitrage CD is embedded onto the distributed ledger based on the processing.

2. The method of claim 1 further comprising:

receiving, using the communication device, at least one CD identifier associated with at least one CD from the at least one investor device, wherein the at least one CD is associated with a value, wherein the at least one investor is in need of the value to satisfy a short-term margin call;

identifying, using the processing device, the at least one CD based on the at least one CD identifier;

generating, using the processing device, at least one Depository Trading Receipt (DTR) CD for the at least one CD based on the identifying;

analyzing, using the processing device, the at least one DTR CD;

determining, using the processing device, a maturity status of the at least one DTR CD; and transmitting, using the communication device, the maturity status associated with at least one DTR CD to the at least one investor device.

3. The method of claim 2 further comprises creating, using the processing device, a third smart contract with at least one information associated with the at least one CD based on the generating of the at least one DTR CD, wherein the third smart contract at least one of withdraws and credits at least one payment between a plurality of accounts based on the determining.

4. The method of claim 1 further comprising:

receiving, using the communication device, investment request data from the at least one investor device, wherein the investment request data comprises an investment of a value in at least one CD in a future time and at least one investor data associated with the at least one investor;

creating, using the processing device, a fourth smart contract based on the investment request data, wherein the fourth smart contract comprises at least one information associated with the investment, wherein a depository trading receipt (DTR) of the fourth smart contract is issued based on the creating;

analyzing, using the processing device, the fourth smart contract;

generating, using the processing device, a premium data associated with at least one premium to be paid to the at least one issuer based on the analyzing of the fourth smart contract;

transmitting, using the communication device, the DTR of the fourth smart contract for an exchange and the premium data to a plurality of issuer devices associated with a plurality of issuers;

receiving, using the communication device, at least one acknowledgment for the exchange from the at least one issuer device, wherein the at least one premium is credited to at least one issuer account associated with the at least one issuer using the fourth smart contract based on the at least one acknowledgment;

comparing, using the processing device, a current date associated with the DTR of the fourth smart contract with an excise date associated with the DTR of the fourth smart contract; and determining, using the processing device, a maturity status of the DTR of the fourth smart contract based on the comparing, wherein at least one principal amount is credited into the at least one issuer account using the fourth smart contract based on the determining, wherein the at least one investor purchases the at least one CD on the excise date.

5. The method of claim 1 further comprising:
receiving, using the communication device, a second investment request data from the at least one investor device associated with at least one investor, wherein the second investment request data comprises an investment of a value in the at least one certificate of deposit (CD) in a future time, wherein the investment of the value in the at least one CD is associated with a term;
creating, using the processing device, a fifth smart contract based on the second investment request data, wherein the fifth smart contract comprises at least one information associated with the investment, wherein a DTR of the fifth smart contract is issued based on the creating;
analyzing, using the processing device, the fifth smart contract;
generating, using the processing device, a premium data associated with at least one premium to be paid to at least one issuer based on the analyzing of the fifth smart contract;
transmitting, using the communication device, the DTR of the fifth smart contract for an exchange and the premium data to a plurality of issuer devices associated with a plurality of issuers;
receiving, using the communication device, at least one acknowledgment for the exchange from the at least one issuer device, wherein the at least one premium is credited to at least one issuer account associated with the at least one issuer using the fifth smart contract based on the at least one acknowledgment;
receiving, using the communication device, a sell request for selling the fifth smart contract from the at least one investor device;
transmitting, using the communication device, the sell request to a plurality of buyer devices associated with a plurality of buyers;
receiving, using the communication device, buy data from at least one buyer device associated with at least one buyer, wherein the buy data comprises an acknowledgment for buying the fifth smart contract and at least one buyer data associated with the at least one buyer; and
processing, using the processing device, a transaction of the fifth smart contract between the at least one investor and the at least one buyer using the at least one investor data and the at least one buyer data.

6. The method of claim 1 further comprising:
receiving, using the communication device, a third purchase request data from at least one speculator device associated with at least one speculator, wherein the third purchase request data comprises at least one CD identifier associated with the at least one CD and at least one speculator data associated with the at least one speculator;
identifying, using the processing device, the at least one CD based on the at least one CD identifier, wherein at least one bank offers the at least one CD;
processing, using the processing device, a transaction of the at least one CD using the at least one speculator data based on the identifying;
receiving, using the communication device, at least one coupon creating data from the at least one speculator device, wherein the at least one coupon creating data comprises a coupon creating request and at least one coupon data for creating a number of coupons;
removing, using the processing device, at least one coupon associated with the at least one CD based on the coupon creating request;
generating, using the processing device, the number of coupons from the at least one CD based on the removing and the at least one coupon data.

7. The method of claim 6 further comprises creating, using the processing device, a sixth smart contract for each coupon of the number of coupons, wherein the sixth smart contract of each coupon of the number of coupons is traded.

8. A system of facilitating trading non-negotiable financial assets, the system comprising:
a communication device configured for:
  receiving an issue data from at least one issuer device associated with at least one issuer;
  receiving a purchase request data from at least one investor device associated with at least one investor, wherein the purchase request data comprises a CD identifier associated with a certificate of deposit (CD) and at least one investor data associated with the at least one investor, wherein the at least one investor is interested in buying the CD;
  transmitting the CD to the at least one investor device;
  receiving a second purchase request data from at least one speculator device associated with at least one speculator, wherein the second purchase request data comprises at least one certificate of deposit (CD) identifier associated with at least one CD and at least one speculator data associated with the at least one speculator;
  receiving an arbitrage creating request from the at least one speculator device;
  transmitting a maturity status to the at least one investor device; and
  receiving DTR purchase request data from the at least one investor device associated with the at least one investor, wherein the DTR purchase request data comprises at least one DTR identifier associated with the at least one DTR Arbitrage CD and at least one investor data associated with the at least one investor;
a processing device communicatively coupled with the communication device, wherein the processing device is configured for:
  issuing the CD based on the issue data, wherein the non-negotiable financial asset comprises the certificate of deposit (CD), wherein the certificate of deposit (CD) is a savings account holding a fixed amount of money for a specified time;
  identifying the CD based on the CD identifier;
  processing a transaction for the CD using the at least one investor data;
  generating at least one transaction attribute associated with the transaction based on the processing;
  identifying the at least one CD based on the at least one CD identifier, wherein at least one bank offers the at least one CD, wherein the at least one CD is associated with a term and a coupon;
  processing a transaction of the at least one CD using the at least one speculator data based on the identifying;
  generating at least one Depository Trading Receipt (DTR) Arbitrage CD for the at least one CD based on the arbitrage creating request;
  identifying the at least one DTR Arbitrage CD based on the at least one DTR identifier;

processing a transaction for the at least one DTR Arbitrage CD using the at least one investor data based on the identifying;

analyzing the at least one DTR Arbitrage CD; and determining the maturity status of the at least one DTR Arbitrage CD;

creating a second smart contract with at least one information associated with the at least one CD based on the generating of the at least one DTR Arbitrage CD, wherein the second smart contract credits at least one principal payment and at least one interest payment into at least one account of the at least one investor based on the determining, and wherein the second smart contract is appended with at least one new information based on the transaction for the at least one DTR Arbitrage CD, wherein the second smart contract and the transaction for the at least one DTR Arbitrage CD is embedded onto the distributed ledger based on the processing; and a storage device communicatively coupled with the communication device, wherein the storage device is configured for storing the at least one transaction attribute in a distributed ledger using a smart contract, wherein the at least one transaction attribute is validated through a proof-of-stake with at least one CD Coin.

9. The system of claim 8, wherein the communication device is further configured for:

receiving at least one CD identifier associated with at least one CD from the at least one investor device, wherein the at least one CD is associated with a value, wherein the at least one investor is in need of the value to satisfy a short-term margin call; and transmitting a maturity status associated with at least one DTR CD to the at least one investor device, wherein the processing device is further configured for:

identifying the at least one CD based on the at least one CD identifier;

generating at least one Depository Trading Receipt (DTR) CD for the at least one CD based on the identifying;

analyzing the at least one DTR CD; and determining the maturity status of the at least one DTR CD.

10. The system of claim 9, wherein the processing device is further configured for creating a third smart contract with at least one information associated with the at least one CD based on the generating of the at least one DTR CD, wherein the third smart contract at least one of withdraws and credits at least one payment between a plurality of accounts based on the determining.

11. The system of claim 8, wherein the communication device is further configured for:

receiving investment request data from the at least one investor device, wherein the investment request data comprises an investment of a value in at least one CD in a future time and at least one investor data associated with the at least one investor;

transmitting a depository trading receipt (DTR) of a fourth smart contract for an exchange and the premium data to a plurality of issuer devices associated with a plurality of issuers; and receiving at least one acknowledgment for the exchange from the at least one issuer device, wherein the at least one premium is credited to at least one issuer account associated with the at least one issuer using the fourth smart contract based on the at least one acknowledgment, wherein the processing device is further configured for:

creating the fourth smart contract based on the investment request data, wherein the fourth smart contract comprises at least one information associated with the investment, wherein the DTR of the fourth smart contract is issued based on the creating;

analyzing the fourth smart contract;

generating a premium data associated with at least one premium to be paid to the at least one issuer based on the analyzing;

comparing a current date associated with the DTR of the fourth smart contract with an excise date associated with the DTR of the fourth smart contract; and determining a maturity status of the DTR of the fourth smart contract based on the comparing, wherein at least one principal amount is credited into the at least one issuer account using the fourth smart contract based on the determining, wherein the at least one investor purchases the at least one CD on the excise date.

12. The system of claim 8, wherein the communication device is further configured for:

receiving a second investment request data from the at least one investor device associated with at least one investor, wherein the second investment request data comprises an investment of a value in the at least one certificate of deposit (CD) in a future time, wherein the investment of the value in the at least one CD is associated with a term;

transmitting a DTR of a fifth smart contract for an exchange and the premium data to a plurality of issuer devices associated with a plurality of issuers;

receiving at least one acknowledgment for the exchange from the at least one issuer device, wherein the at least one premium is credited to at least one issuer account associated with the at least one issuer using the fifth smart contract based on the at least one acknowledgment;

receiving a sell request for selling the fifth smart contract from the at least one investor device;

transmitting the sell request to a plurality of buyer devices associated with a plurality of buyers; and receiving buy data from at least one buyer device associated with at least one buyer, wherein the buy data comprises an acknowledgment for buying the fifth smart contract and at least one buyer data associated with the at least one buyer, wherein the processing device is further configured for:

creating the fifth smart contract based on the second investment request data, wherein the fifth smart contract comprises at least one information associated with the investment, wherein a DTR of the fifth smart contract is issued based on the creating;

analyzing the fifth smart contract;

generating a premium data associated with at least one premium to be paid to at least one issuer based on the analyzing of the fifth smart contract; and processing a transaction of the fifth smart contract between the at least one investor and the at least one buyer using the at least one investor data and the at least one buyer data.

13. The system of claim 8, wherein the communication device is further configured for:

receiving a third purchase request data from at least one speculator device associated with at least one speculator, wherein the third purchase request data comprises at least one CD identifier associated with at least one CD and at least one speculator data associated with the at least one speculator; and receiving at least one coupon creating data from the at least one speculator device, wherein the at least one coupon creating data comprises a coupon creating request and at least one coupon data for creating a number of coupons, wherein the processing device is further configured for:

identifying the at least one CD based on the at least one CD identifier, wherein at least one bank offers the at least one CD;

processing a transaction of the at least one CD using the at least one speculator data based on the identifying;

removing at least one coupon associated with the at least one CD based on the coupon creating request; and generating the number of coupons from the at least one CD based on the removing and the at least one coupon data.

14. The system of claim 13, wherein the processing device is further configured for creating a sixth smart contract for each coupon of the number of coupons, wherein the sixth smart contract of each coupon of the number of coupons is traded.

* * * * *